United States Patent
Mysore Vijaya Kumar et al.

(10) Patent No.: US 9,578,279 B1
(45) Date of Patent: Feb. 21, 2017

(54) PREVIEW STREAMING OF VIDEO DATA

(71) Applicant: Amazon Technologies, Inc., Seattle, WA (US)

(72) Inventors: Rohith Mysore Vijaya Kumar, Sunnyvale, CA (US); Ambrish Tyagi, Palo Alto, CA (US); Yadunandana Nagaraja Rao, Sunnyvale, CA (US); Suresh Bholabhai Lakhani, Cupertino, CA (US); Amit Kumar Agrawal, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/974,800

(22) Filed: Dec. 18, 2015

(51) Int. Cl.
| | |
|---|---|
| H04N 5/917 | (2006.01) |
| H04N 7/01 | (2006.01) |
| G06T 7/40 | (2006.01) |
| G06K 9/46 | (2006.01) |
| G06K 9/00 | (2006.01) |

(52) U.S. Cl.
CPC .......... *H04N 5/917* (2013.01); *G06K 9/00664* (2013.01); *G06K 9/00711* (2013.01); *G06K 9/4642* (2013.01); *G06T 7/408* (2013.01); *H04N 7/0102* (2013.01); *H04N 7/0127* (2013.01); *G06T 2207/10016* (2013.01); *G06T 2207/10024* (2013.01)

(58) Field of Classification Search
CPC .... H04N 5/917; H04N 7/0102; H04N 7/0127; H04N 5/23229; H04N 5/23232; H04N 19/37; G06K 9/00664; G06K 9/00711; G06K 9/4642; G06T 7/408
See application file for complete search history.

(56) References Cited

U.S. PATENT DOCUMENTS

| | | | | | |
|---|---|---|---|---|---|
| 4,293,778 | A | * | 10/1981 | Williams | ............. G08B 13/126 307/147 |
| 4,331,721 | A | * | 5/1982 | Ayers | ........................ A01G 5/04 156/61 |
| 4,655,739 | A | * | 4/1987 | Pratt | ................... A61F 13/2082 270/42 |
| 2002/0187720 | A1 | * | 12/2002 | Engle | ..................... A63H 33/10 446/85 |
| 2011/0258944 | A1 | * | 10/2011 | Radoane | ................... E04B 2/58 52/62 |

* cited by examiner

*Primary Examiner* — Nicholas Giles
(74) *Attorney, Agent, or Firm* — Seyfarth Shaw LLP; Ilan N. Barzilay; Cyrus A. Miller

(57) ABSTRACT

A system and method for generating preview data from video data and using the preview data to select portions of the video data or determine an order with which to upload the video data. The system may sample video data to generate sampled video data and may identify portions of the sampled video data having complexity metrics exceeding a threshold. The system may upload a first portion of the video data corresponding to the identified portions while omitting a second portion of the video data. The system may determine an order with which to upload portions of the video data based on a complexity of the video data. Therefore, portions of the video data that may require additional processing after being uploaded may be prioritized and uploaded first. As a result, a latency between the video data being uploaded and a video summarization being received is reduced.

20 Claims, 31 Drawing Sheets

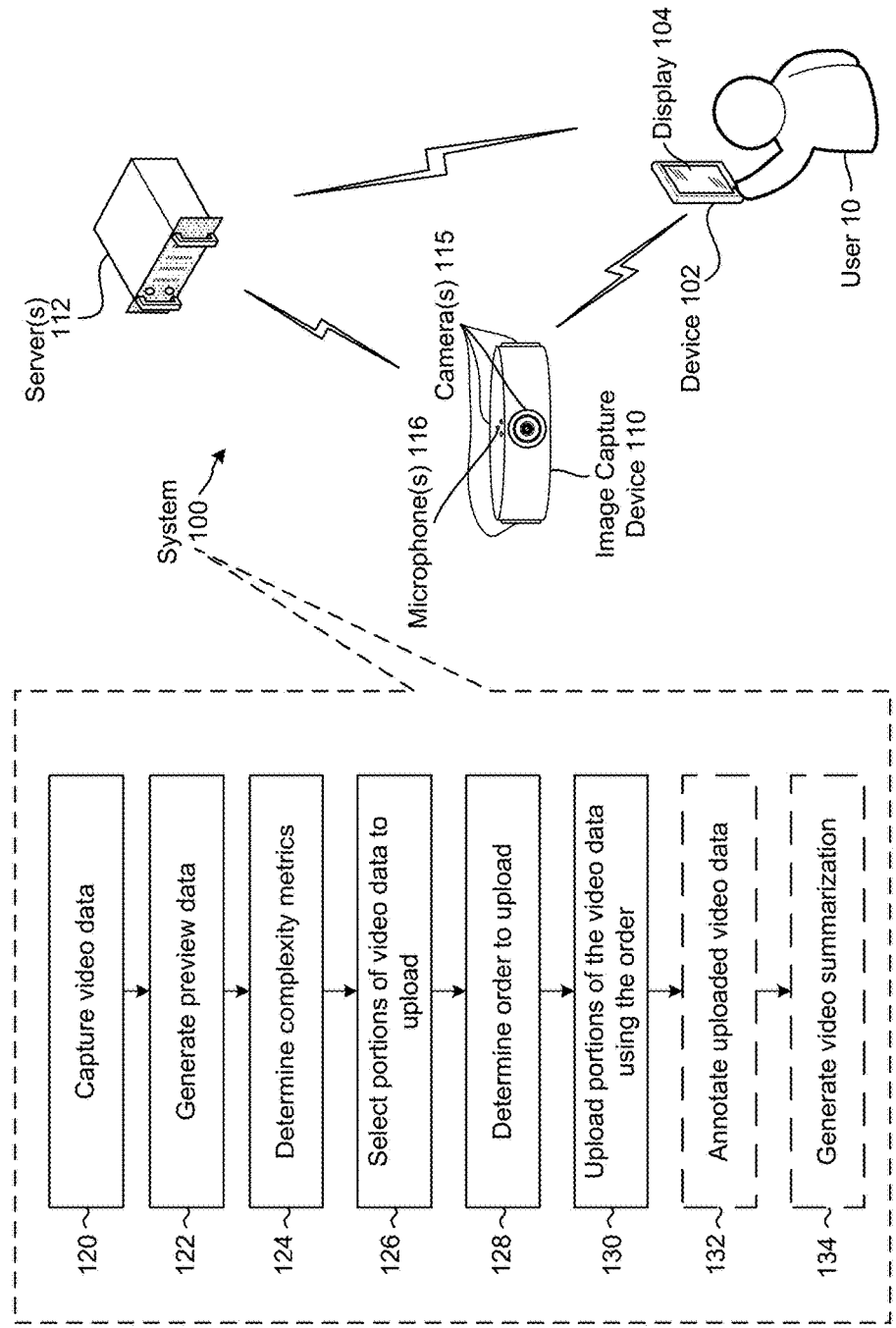

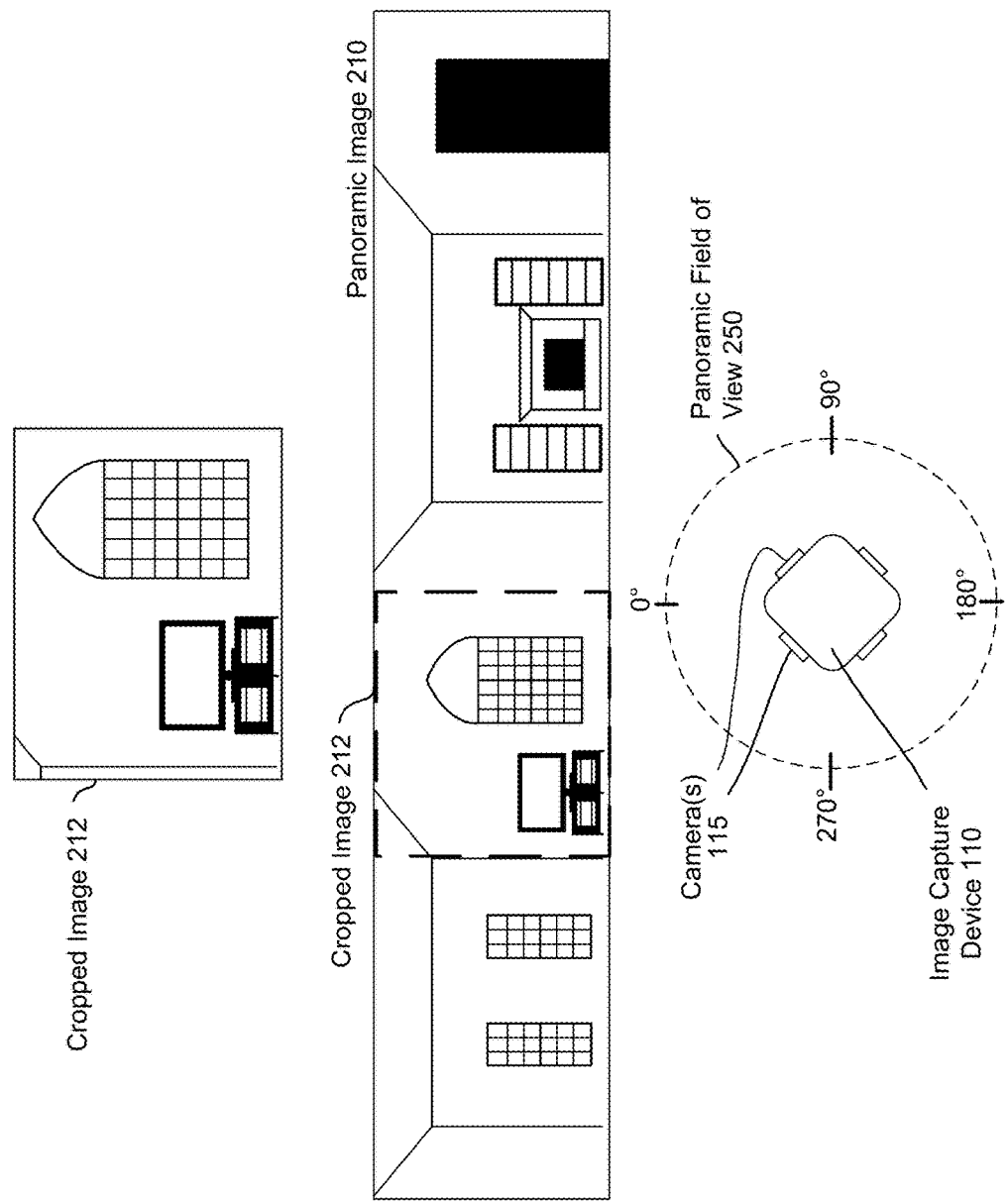

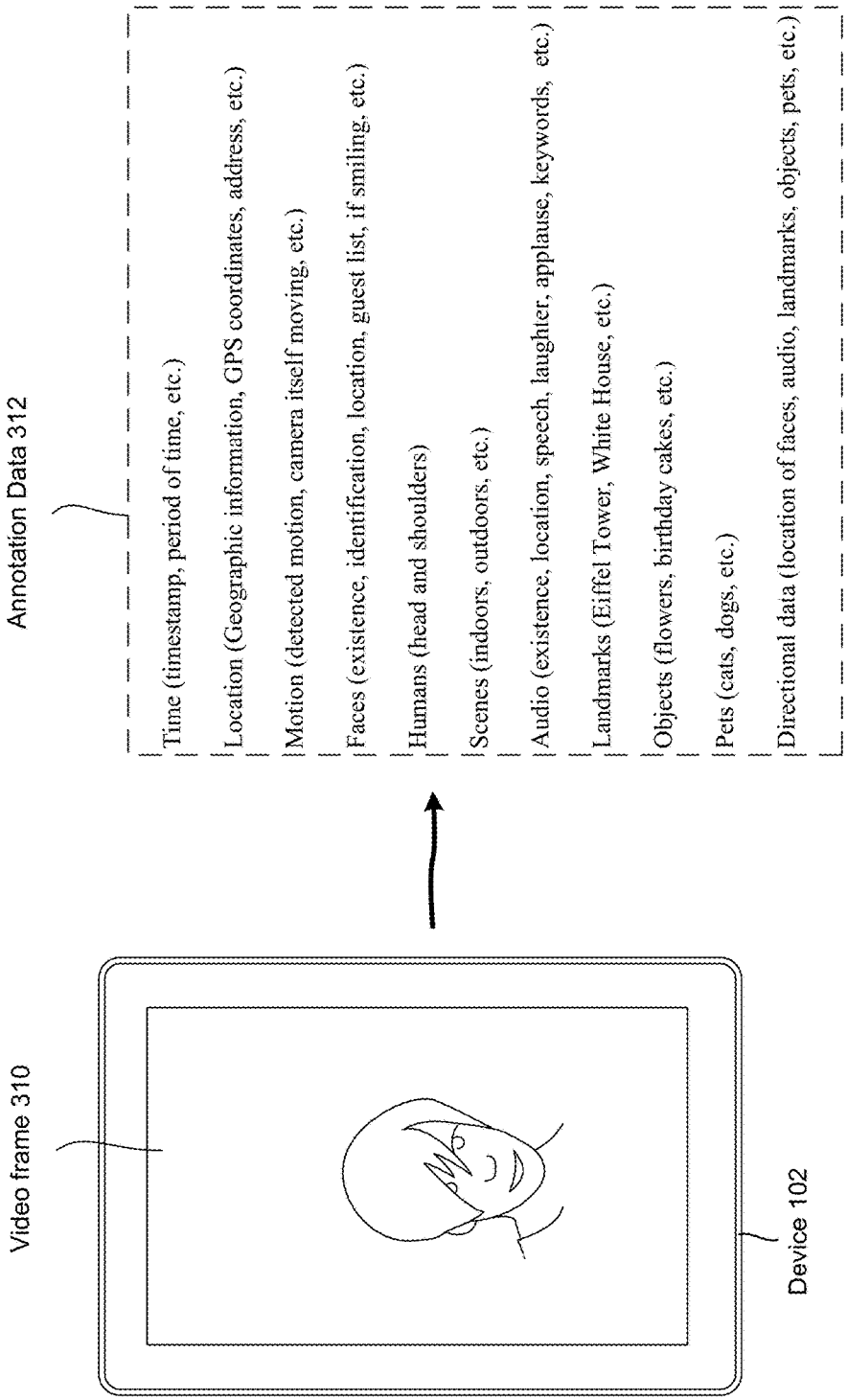

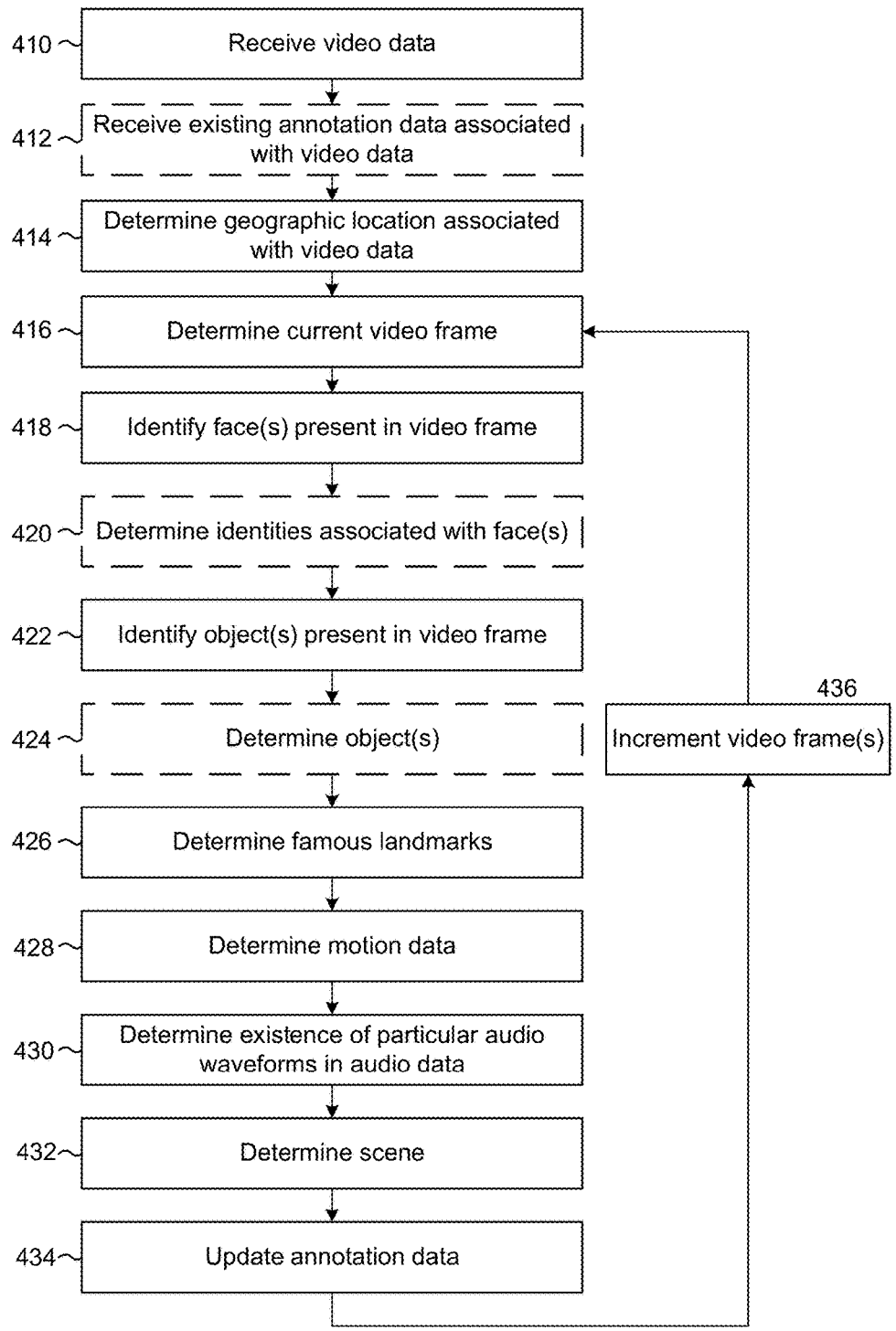

FIG. 5A

| Frame | Time, Location, Motion, Faces, Humans, Scenes, Audio, Landmarks, Objects, Pets, Directional Data, etc. |
|---|---|
| Frame 1 | |
| Frame 2 | |
| Frame 3 | |
| Frame 10 | |
| Frame 11 | |
| Frame 30 | |
| Frame 35 | |

Annotation Database 510

FIG. 5C

| Frame | Priority Metric | Time, Location, Motion, Faces, Humans, Scenes, Audio, Landmarks, Objects, Pets, Directional Data, etc. |
|---|---|---|
| Frames 1-200 | | |
| Frames 350-600 | | |
| Frames 800-1200 | | |
| Frames 1500-1650 | | |
| Frames 2000-2200 | | |
| Frames 2400-2550 | | |
| Summary Data | | |

Annotation Database 514

FIG. 5D

| Clip | Frames Included | Priority Metric | Summary Data | Time/Position of interesting moments |
|---|---|---|---|---|
| Clip 1 | | | | |
| Clip 2 | | | | |
| Clip 3 | | | | |
| Clip 4 | | | | |
| Clip 5 | | | | |
| Clip 6 | | | | |
| Clip 7 | | | | |

Master Clip Table (MCT) 520

FIG. 5E

| Clip | Capture Date | Frames Included | Priority Metric | Summary Data | Time/Position of interesting moments |
|---|---|---|---|---|---|
| Clip 1 | 9/15/2015 | | | | |
| Clip 2 | 9/15/2015 | | | | |
| Clip 3 | 9/15/2015 | | | | |
| Clip 4 | 9/15/2015 | | | | |
| Clip 50 | 9/24/2015 | | | | |
| Clip 51 | 9/24/2015 | | | | |
| Clip 52 | 9/24/2015 | | | | |

Master Clip Table (MCT) 522

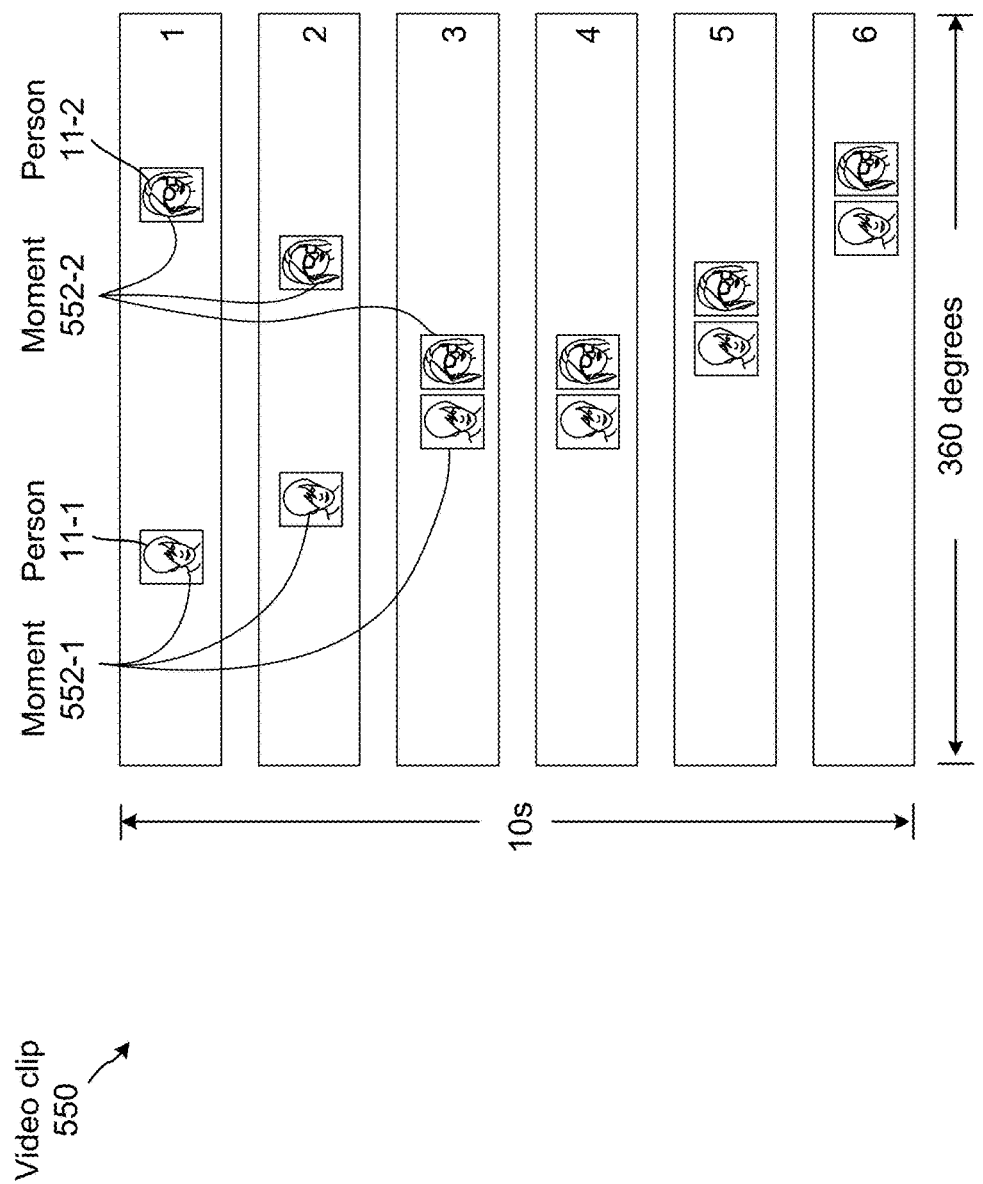

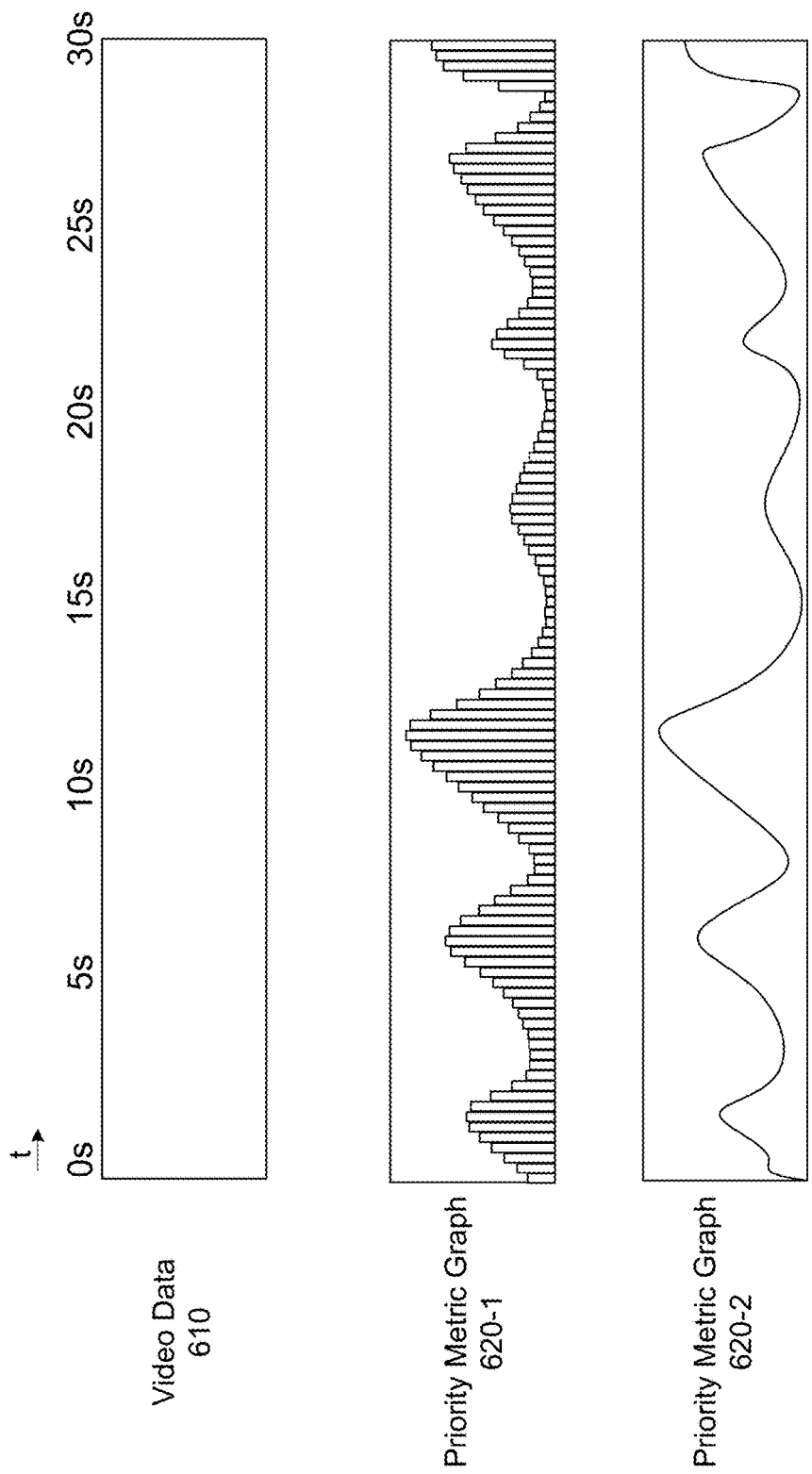

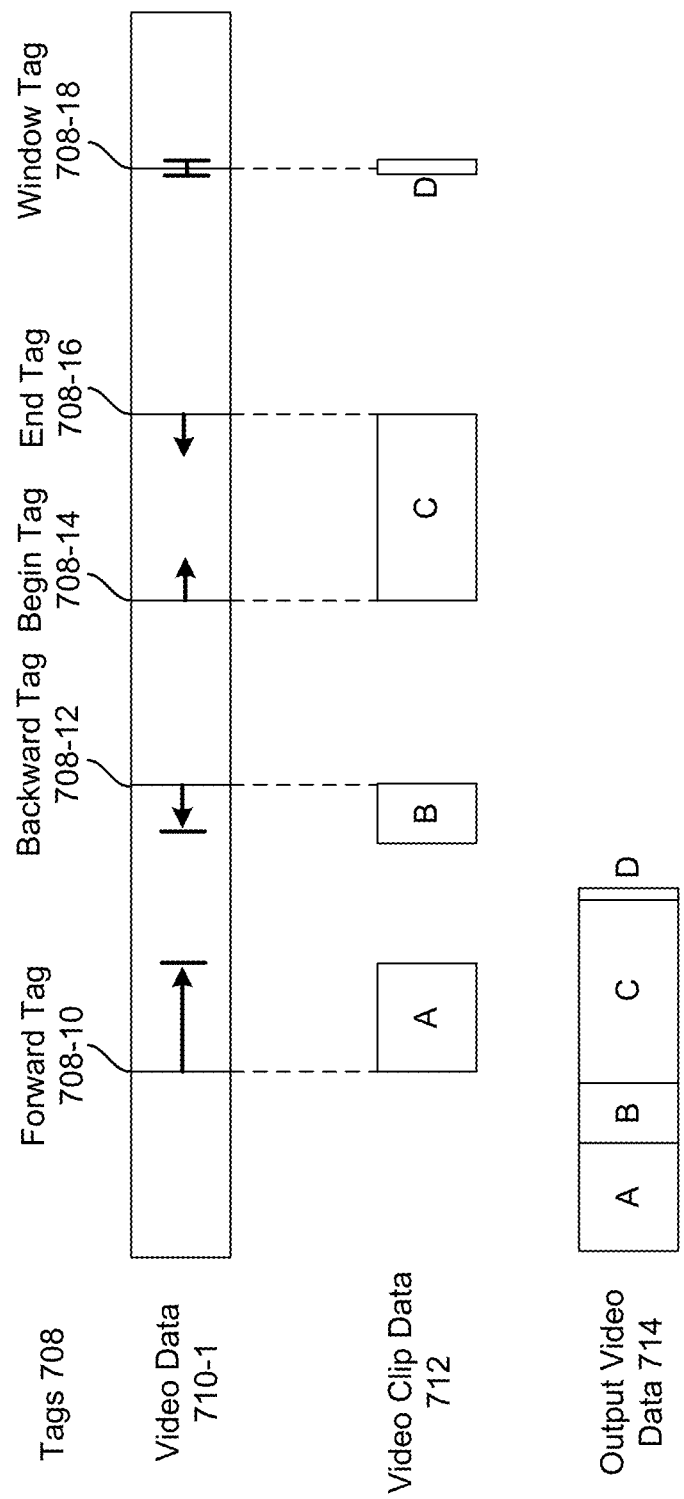

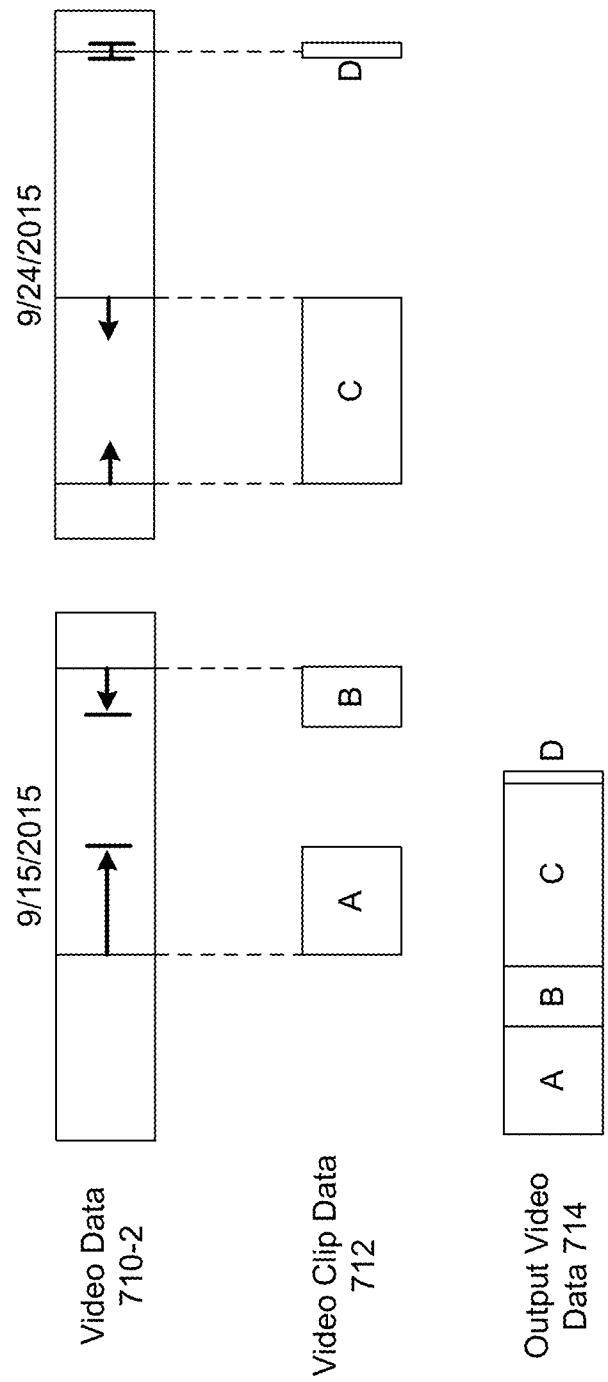

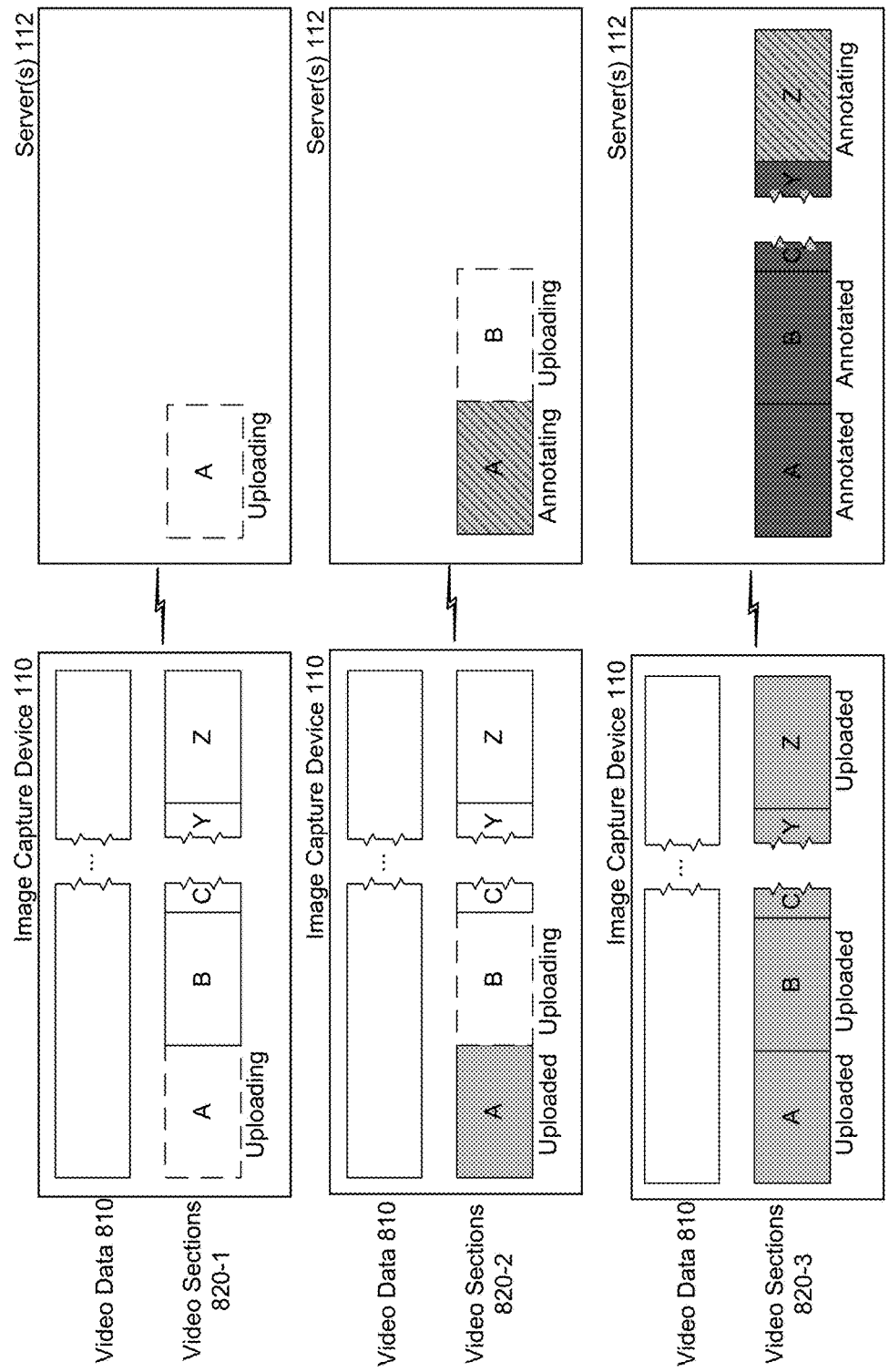

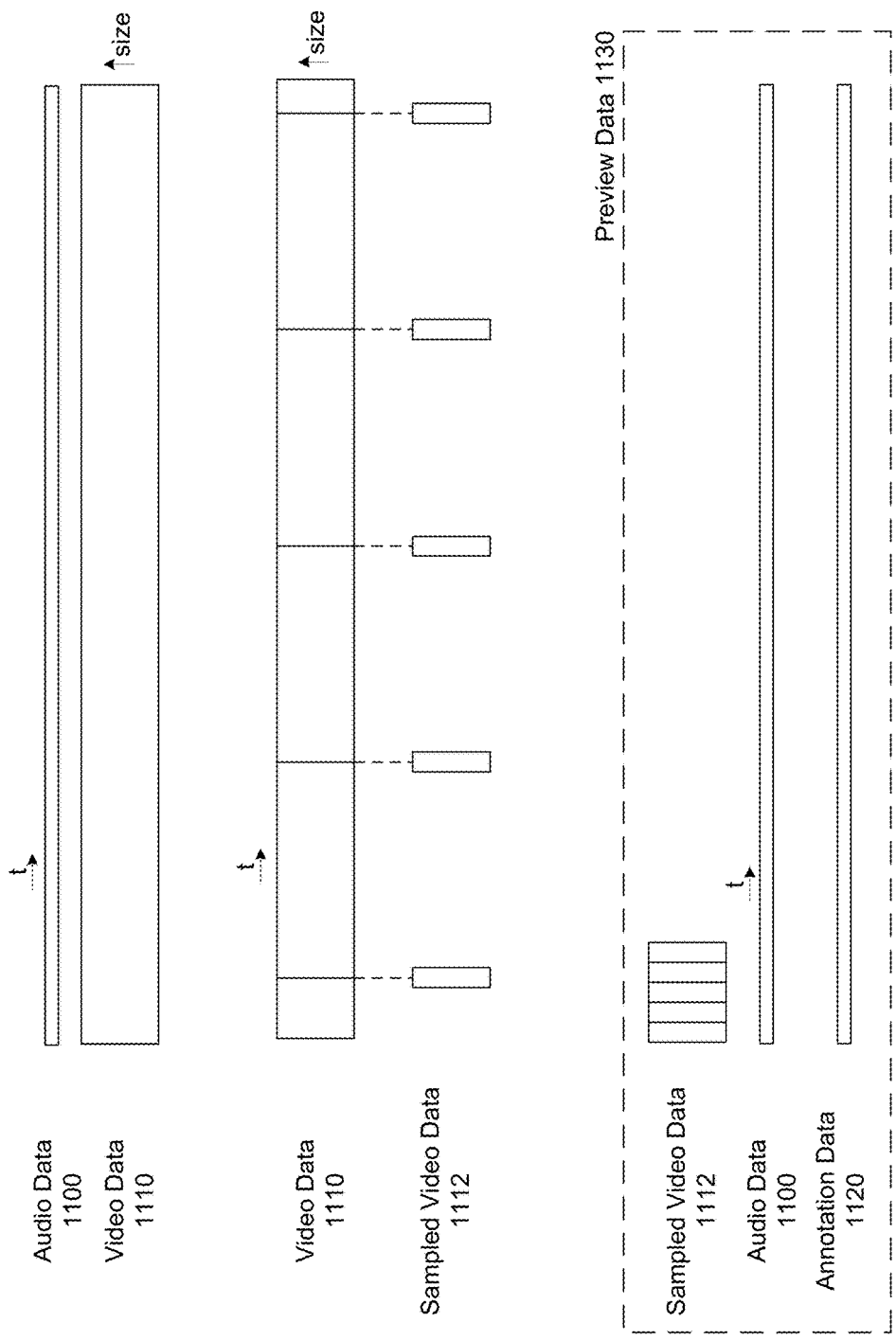

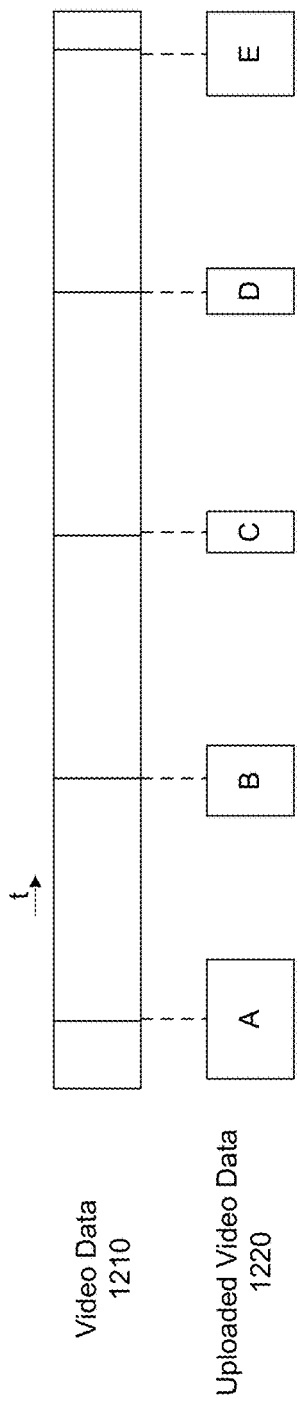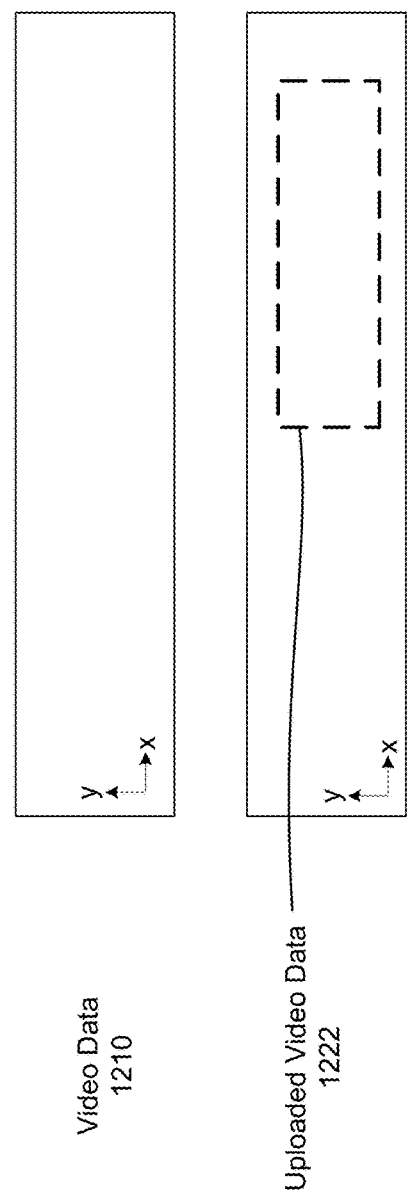

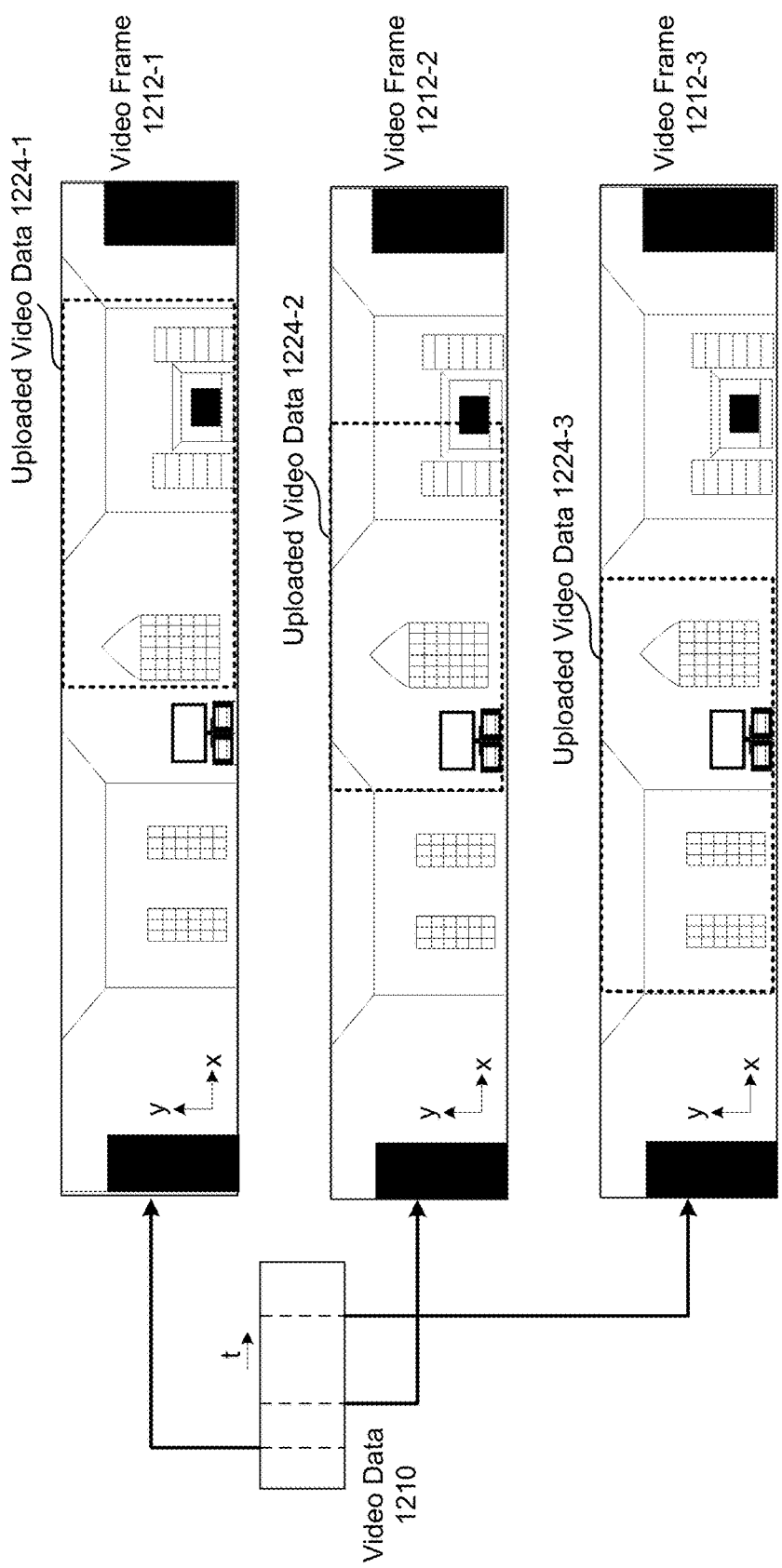

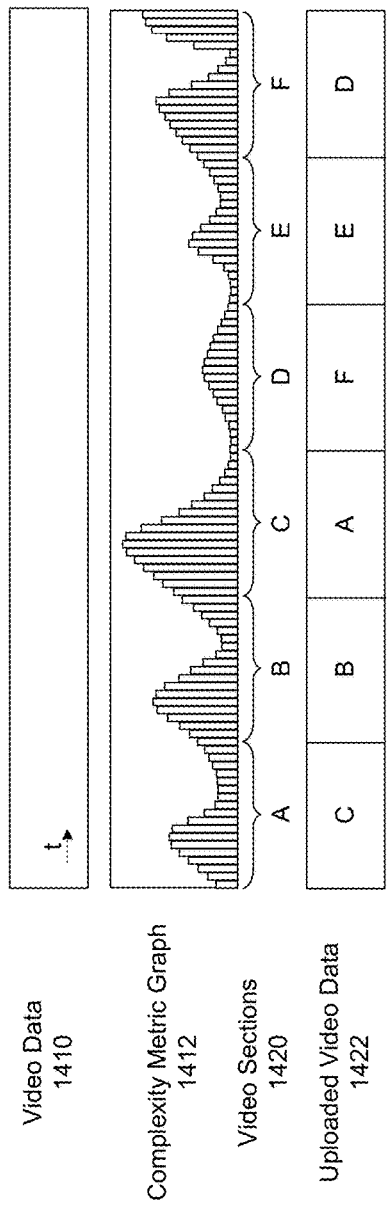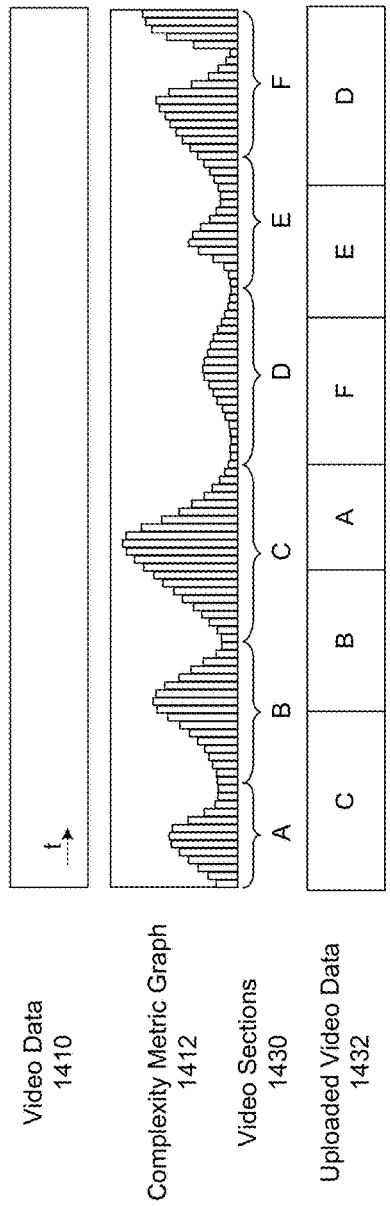

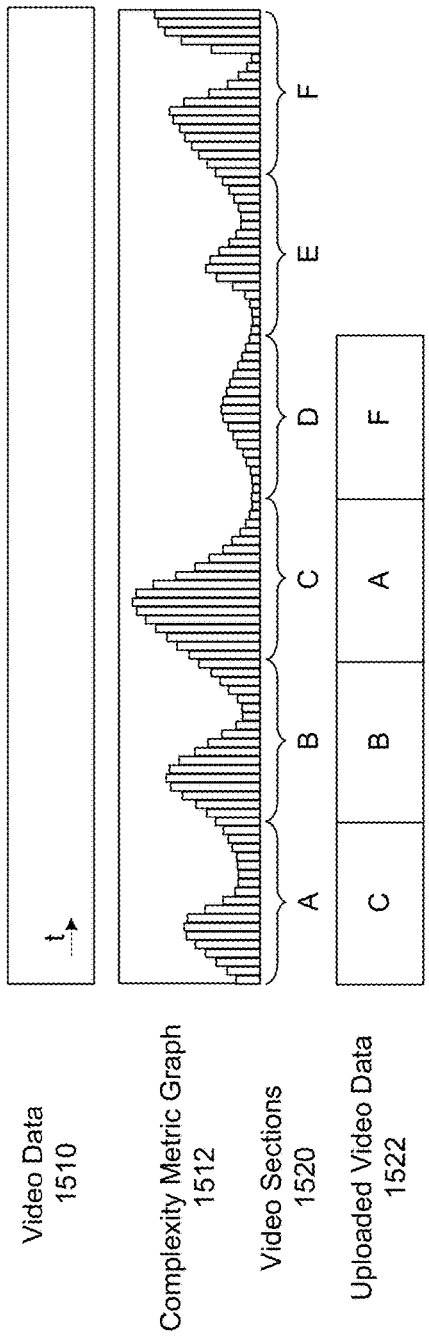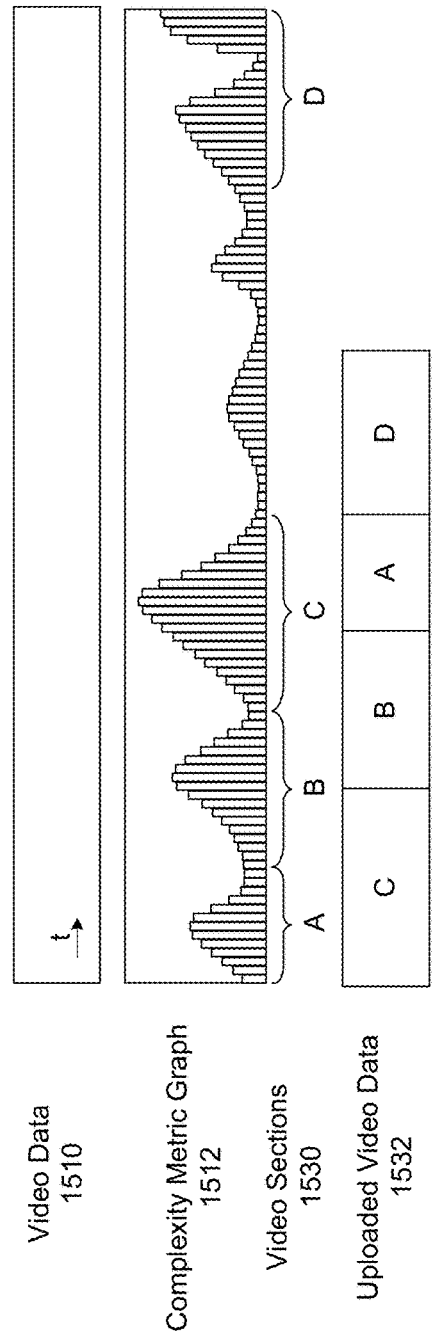

PREVIEW STREAMING OF VIDEO DATA

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve how the videos are generated.

BRIEF DESCRIPTION OF DRAWINGS

For a more complete understanding of the present disclosure, reference is now made to the following description taken in conjunction with the accompanying drawings.

FIG. 1 illustrate overviews of systems for implementing embodiments of the present disclosure.

FIGS. 2A-2B illustrate examples of cropping video data in time and space according to embodiments of the present disclosure.

FIG. 3 illustrates an example of annotation data according to embodiments of the present disclosure.

FIG. 4 is a flowchart conceptually illustrating an example method for generating annotation data according to embodiments of the present disclosure.

FIGS. 5A-5H illustrate examples of annotation data according to embodiments of the present disclosure.

FIG. 6 illustrates examples of priority metric graphs according to embodiments of the present disclosure.

FIGS. 7A-7C illustrate examples of generating video summarizations according to embodiments of the present disclosure.

FIG. 8 illustrates an example of uploading and processing individual video sections to improve a latency associated with annotating the video data according to embodiments of the present disclosure.

FIG. 11 illustrates an example of preview data according to embodiments of the present disclosure.

FIGS. 12A-12C illustrate examples of selecting portions of video data in time and/or space according to embodiments of the present disclosure.

FIGS. 14A-14B illustrate examples of determining an order to upload individual video sections according to embodiments of the present disclosure.

FIGS. 15A-15B illustrates examples of determining an order to upload individual video sections including a portion of video data according to embodiments of the present disclosure.

DETAILED DESCRIPTION

Figure 2B:
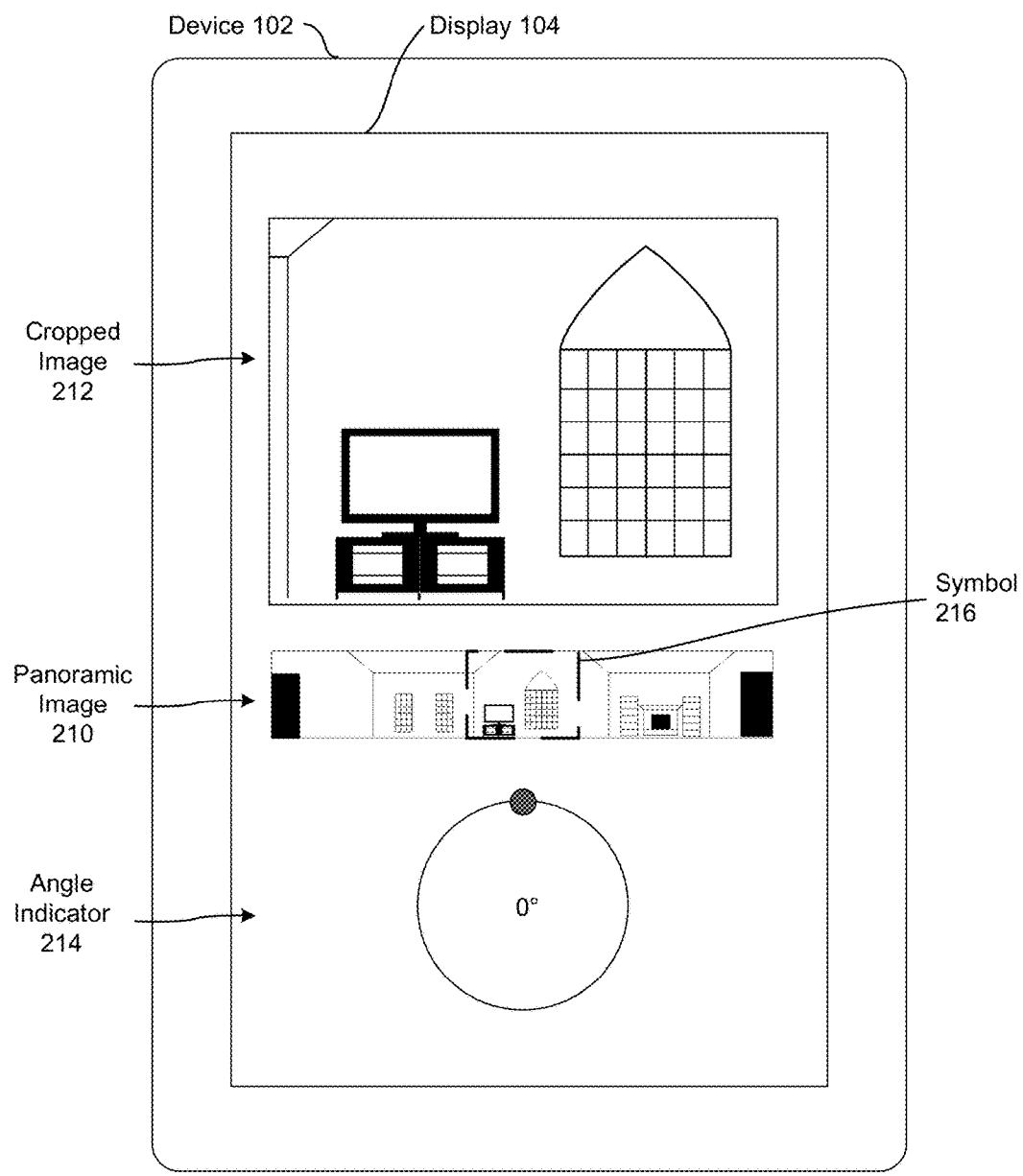

Electronic devices are commonly used to capture video data. The devices may capture video data over a lengthy period of time and some devices may capture a wide field of view in order to capture video showing a wide area. Given the amount of captured video, certain devices may upload video data to a remote server with greater processing/storage resources for purposes of editing, storage, etc. Uploading all captured video data to a server, however, may consume bandwidth and require a lengthy period of upload time to complete. As additional processing may be performed on the video data after being uploaded, the upload time may increase a delay or latency between when the video data is first uploaded and when the additional processing (for example editing) is completed.

To reduce such bandwidth consumption and/or latency, devices, systems and methods are disclosed that identify certain initially selected portions from the captured video to upload to the server. A local video capture device may then generate and upload data corresponding to those certain selection portions (which may include, for example, audio data, annotation data, and low frame rate video data sampled from the video data) from an image capture device to a server. The data related to the selected portions may be referred to herein as "video preview data," or "preview data" as the data allows the server to preview the contents of the captured video and begin certain processing prior to uploading of a larger universe of video data. As used herein, "video preview data" or "preview data" may include not only image data or audio data as typically associated with video data, but also ancillary data/metadata (such as annotation data, etc.) used to describe the contents of the selected portions as described below. Further, as described below, the preview data may include low frame rate video data corresponding to the selected portions, which will further improve bandwidth consumption/latency.

Using the preview data, the image capture device and/or server may identify portions of the video data to upload and/or determine an order with which to upload the portions of the video data. As a first example, using the preview data the server may identify further portions of the captured video to upload, reducing a bandwidth consumption and/or upload time otherwise associated with uploading all the video data associated with the captured video in its entirety. As a second example, using the preview data the server may identify portions of the captured video requiring more extensive additional processing and may determine an order with which the image capture device uploads the video data. The image capture device may ultimately upload the video data in its entirety but may prioritize which portions of the video data to upload first, providing the server additional time to perform the extensive additional processing of the earlier uploaded portions and therefore reducing a latency associated with the total processing. In a third example, using the preview data the server itself may identify portions of the captured video to upload, identify portions of the video data requiring more extensive additional processing and determine an order with which the image capture device should upload the video data. Additionally or alternatively, the image capture device may perform any or all of the steps described above in the first example, the second example and/or the third example. Thus, determination of the preview data may reduce a bandwidth consumption and/or upload time associated with uploading the video data and reduce a latency associated with the additional processing.

FIG. 1 illustrates an overview of a system 100 for implementing embodiments of the disclosure. The system 100 includes a device 102 having a display 104, an image capture device 110 (having camera(s) 115 and microphone(s) 116) and server(s) 112 all in communication with each other. While FIG. 1 illustrates the camera(s) 115 being equally spaced around the image capture device 110, the disclosure is not limited thereto and a location of the camera(s) 115 may vary without departing from the disclosure. Similarly, while FIG. 1 illustrates the microphone(s) 116 located on a top portion of the image capture device 110, the disclosure is not limited thereto and a location of the microphone(s) 116 may vary without departing from the disclosure. For example, the microphone(s) 116 may be aligned with the camera(s) 115 or may be spaced between the camera(s) 115 without departing from the disclosure.

While the following descriptions (of either FIG. 1 or other figures) may refer to one of the device 102, the image capture device 110 and/or the server(s) 112 performing steps illustrated in the drawings, the steps may be performed by any of the device 102, the image capture device 110 and/or the server(s) 112 without departing from the present disclosure. In addition, the device 102, the image capture device 110, the server(s) 112 or a combination thereof may receive input from a user 10 without departing from the disclosure. While FIG. 1 illustrates the system 100 including the device 102, the image capture device 110 and the server(s) 112, the system 100 may include any of the device 102, the image capture device 110, the server(s) 112 or a combination thereof without departing from the disclosure. For example, the image capture device 110 and the server(s) 112 may perform all of the steps illustrated in the drawings without communicating with the device 102.

As illustrated in FIG. 1, the system 100 may capture (120) video data. In some examples, the video data may be captured by the image capture device 110 and may be panoramic video data having a field of view beyond 180 degrees, which corresponds to video data with an aspect ratio greater than 2:1. However, the present disclosure is not limited thereto and the video data may have any field of view/aspect ratio and/or may be captured by other devices.

The system 100 may generate (122) preview data using the video data. The preview data may include audio data, annotation data (which, as described below, may describe the video and/or audio data) and sampled video data. For example, the image capture device 110 may capture the video data at a first sampling frequency (e.g., 30 frames per second/Hz) and may generate preview data including sampled video data at a second sampling frequency (e.g., 1 frame per second). Thus, the preview data covering a certain elapsed time period may have fewer frames than the raw video data covering the same elapsed time period and may therefore be uploaded using fewer processing resources and/or bandwidth than uploading the video data in its entirety.

The system 100 may determine (124) complexity metrics using the preview data. For example, the server(s) 112 may generate complexity metrics for each frame of the sampled video data using the annotation data or using computer vision (CV) processing (or other processing) on the sampled video data. The system 100 may select (126) portions of the video data to upload, may determine (128) an order to upload the portions of the video data based on the complexity metrics and may upload (130) the portions of the video data using the order. For example, the server(s) 112 may identify a first portion of the video data associated with relatively low complexity metrics (e.g., which may correspond, for example, to video data showing a static image, an image with limited motion, limited transitions between frames, certain audio cues or the like) and a second portion of the video data associated with relatively high complexity metrics (e.g., video data showing multiple faces, increased motion, multiple transitions, including certain audio cues or the like). In a first example, the server(s) 112 may select the first portion and the second portion to upload but may determine the order to upload the second portion before the first portion. Thus, while the image capture device 110 may ultimately upload an entirety of the video data to the server(s) 112, the image capture device 110 may upload the second portion prior to the first portion, where the second portion is deemed to have a higher upload complexity than the first portion, so that the server(s) 112 has additional time to process the second portion. In a second example, the server(s) 112 may select only the second portion to upload and the image capture device 110 may upload the second portion chronologically to the server(s) 112. Thus, the server(s) 112 may reduce an upload time associated with the video data by removing an upload time associated with the first portion. In a third example, the server(s) 112 may select only the second portion to upload and may determine an order to upload the second portion to allow for additional time to process complicated portions of the second portion. Thus, the image capture device 110 may upload the second portion to the server(s) 112 in a non-chronological order so that the server(s) 112 may begin processing on the complicated portions first. Various other options are also possible.

The system 100 may optionally annotate (132) the uploaded video data by generating annotation data corresponding to the video data. For example, the server(s) 112 may generate annotation data indicating subjects included in the video data or other characteristics of the video data (hereinafter, subjects and characteristics may be jointly referred to as "characteristics"), such as specific identities, people, faces, objects, pets, locations, landmarks, scenes, etc. represented in the video data or motion data, scene data, audio information, time data, directional data, etc. corresponding to the video data. In some examples, the annotation data may include an annotation database listing individual video frames and associated characteristics, a master clip table listing individual video clips and associated characteristics and/or video tag(s) indicating characteristics corresponding to specific video frame(s).

The system 100 may optionally generate (134) a video summarization using the uploaded video data and the annotation data. For example, the server(s) 112 may generate a video summarization that may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the video tags and/or annotation data, thus including in the video summarization the portions of video data (including the objects, angles, and times or the like) indicated by a user 10 and/or determined to be interesting (e.g., complexity metric exceeding a threshold) by the server(s) 112.

The video data may include multiple video segments (e.g., discrete video segments captured at different times) or may include a single video segment from a beginning time to an ending time. A video segment may include a single video clip (e.g., six video segments corresponds to six video clips captured at different times) and/or multiple video clips included in the video segment (e.g., a first portion of a video segment corresponds to a first video clip and a second portion of the video segment corresponds to a second video clip). In some examples, the server(s) 112 may extract individual video clips included in the video data based on priority metrics and the annotation data. For example, the server(s) 112 may determine a priority metric (e.g., interesting score) for individual video frames within the video data using the annotation data and/or retrieve priority metrics stored in the annotation data. As an example, a video frame including multiple faces interacting with identifiable objects, good lighting, etc. may correspond to a high priority metric, whereas a video frame including a landscape with no faces or identifiable objects may correspond to a low priority metric. Thus, the priority metrics may correspond to a likelihood of interesting content and the server(s) 112 may extract individual video clips based on the priority metrics. For example, the server(s) 112 may identify a series of video frames (e.g., 5-60 seconds) having a priority metric above a threshold and may generate a video clip including the series of video frames. Additionally or alternatively, the server(s) 112 may identify an interesting portion of a video segment using the priority metric values and may generate a video clip including the interesting portion.

As used herein, a priority metric may be determined based on annotation data extracted from the video data using extensive computer vision processing, whereas a complexity metric may be determined based on limited computer vision processing. For example, extensive computer vision processing may identify faces, objects or other subjects represented in the video data along with additional annotation data, whereas limited computer vision processing may generate color histograms, similarity metrics or other image features. Thus, a complexity metric may have a correlation with a priority metric, but the complexity metric may indicate a first series of video frames having simple data (e.g., redundant data, such as similar looking frames, that may be skipped) and a second series of frames having complex data (e.g., dynamic data, such as different looking video frames or changes between video frames or the like that require extensive computer vision processing), whereas a priority metric may indicate a third series of video frames associated with an uninteresting moment (e.g., no faces present, no objects present, poor lighting, etc.) and a fourth series of video frames associated with an interesting moment (e.g., multiple faces and objects present, good lighting etc.). The system 100 may determine the complexity metric in order to select portions of the video data that require the extensive computer vision processing associated with the priority metric. In some examples, the system 100 may determine a similarity metric and may select portions of the video data that require the extensive computer vision processing based on the similarity metric instead of and/or in addition to the complexity metric.

While multiple aspects/embodiments/features may be described on their own (e.g., separate examples illustrated in the following figures), the system 100 may incorporate multiple different features/embodiments as part of the same system without departing from the scope of the disclosure. Thus, the system 100 may include any and all combinations of the features illustrated in the drawings without departing from the present disclosure.

As used herein, panoramic video data may include video data having a field of view beyond 180 degrees, which corresponds to video data with an aspect ratio greater than 2:1. As an example, a frame of panoramic video data may have a resolution of 5200 pixels by 1080 pixels. The panoramic video data may include data output from the one or more image sensors after being processed and/or compressed into a viewable video format. However, the present disclosure is not limited thereto and the video data may be video data having any aspect ratio without departing from the disclosure. The video data may include an edited clip or a video clip generated from larger video data, or, in some examples, the video data may be unedited video data captured by the camera(s) 115. For example, a user 10 of the device 102 may identify relevant video clips, or the user 10, the image capture device 110 and/or the server(s) 112 may identify portions of unedited video data for additional editing (e.g., such as specifying events of interest or regions of interest within the unedited video data).

As used herein, a video clip may be a short section of the video data (having any aspect ratio) including content determined to be "interesting" or desirable for purposes of video summarization. For example, video data may include several video clips that the device 102, the image capture device 110 and/or the server(s) 112 may extract from the video data. The device 102, the image capture device 110 and/or the server(s) 112 may determine a priority metric associated with a video clip using annotation data, the priority metric corresponding to a likelihood of interesting content, and may extract video clips based on the priority metric. Similarly, as used herein a moment may be a region of interest within a video clip. For example, a video clip may include one or several moments associated with a region of interest (e.g., position within the video frame, object/person within the video frame, etc.). A moment may include a bounding box around an interesting object or section of the video clip over time, and additional data may indicate a per-frame priority metric for the moment, a position of a detected face in the video clip, an identity of the detected face, or the like.

As used herein, a video tag is a tag (i.e., data structure) including annotation information that may be used in video summarization and/or rendering information that may be used to render a video. Examples of annotation information include an object, a person, an identity of a person, an angle relative to a camera axis, an area associated with a subject, a position associated with the subject, a timestamp (e.g., a time associated with receiving user input, a time associated with an individual video frame, a range of time associated with a sequence of video frames or the like) and/or other annotation data associated with video frame(s). Examples of rendering information include information used to render a video, such a sequence/order of video data in the rendered video, a begin point and end point associated with individual video clips included in the video, coordinates associated with cropping/panning within the video data, a theme, special effects, filters, layouts and/or transitions between video clips, audio data (e.g., musical track(s) or the like) and/or other editing effects known to one of skill in the art. As described in greater detail above with regard to FIG. 1, the server(s) 112 may determine a video snippet from video data and include parameters of the video snippet in a video tag for video summarization. Therefore, any steps describing processing and/or editing of the video data may also refer to storing processing information in a video tag for subsequent video processing and/or editing of the video data.

The server(s) 112 may render the video (e.g., generate the video summarization) using rendering information included in the generated video tags. For example, the rendering information may indicate an order of the selected video clips, the begin point and end point associated with the individual video clips, the selected theme, the selected panning for the individual video clip(s), the special effects, the audio data and/or other editing steps. As a first example, a first video tag may indicate the order of the selected video clips, a second video tag may indicate the begin point and the end point associated with a single video clip, etc. As a second example, a single video tag may include multiple edits, such as a first video tag indicating the begin point and the end point associated with a single video clip along with the selected panning for the single video clip and the special effects and/or audio data associated with the selected video clip. The video tags may correspond to individual video clip or a group of video clip without departing from the disclosure.

A moment may be associated with a region of interest within a video clip, which may include a time range (e.g., beginning frame and an ending frame) and a position (e.g., x and y pixel coordinates) within the video data. The server(s) 112 may generate video clips based on the time range associated with the moment, but a video clip may include an entirety of the pixel coordinates associated with the video data over the time range. Therefore, the server(s) 112 may determine a region of interest associated with a moment and may determine framing windows that include a portion of the pixel coordinates (e.g., a cropped image). Thus, the server(s) 112 may render the framing windows when generating the video summarization, such that the video summarization only includes the portion of the pixel coordinates associated with the region of interest (indicated by the framing windows) over the time range.

The image capture device 110 may capture the panoramic video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the panoramic video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110 as long as the image capture device 110 captures panoramic video data having an aspect ratio exceeding 2:1.

The panoramic video data may include a plurality of video frames (e.g., sequence of image frames, each image frame associated with a particular time) and the portion of the panoramic video data displayed on the display 104 (e.g., cropped image, image data, etc.) may be associated with a position (e.g., x and y pixel coordinates) within the panoramic video data, a direction (e.g., a directional viewpoint included in the panoramic video data) associated with the panoramic video data and/or an angle (e.g., an azimuth) of the portion relative to a reference location (e.g., a front of the video/image capturing device). The device 102 may determine a cropped image (e.g., image data) within panoramic image data (e.g., a single video frame of the panoramic video data) associated with an angle or may determine the angle based on a position of the cropped image within the panoramic image data. Thus, the cropped image may include a portion of the panoramic image data and dimensions of the cropped image may be smaller than dimensions of the panoramic image data, in some examples significantly smaller. The output video data may include a plurality of cropped images. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The panoramic video data may have an aspect ratio exceeding 2:1. An aspect ratio is a ratio of one dimension of a video frame to another dimension of a video frame (for example height-width or width-height). For example, a video image having a resolution of 7680 pixels by 1080 pixels corresponds to an aspect ratio of 64:9 or more than 7:1. While the panoramic video data (e.g., panoramic image) may have a certain aspect ratio (for example 7:1 or other larger than 2:1 ratio) due to a panoramic/360 degree nature of the incoming video data (Which may result from a single panoramic camera or multiple images taken from multiple cameras combined to make a single frame of the panoramic video data), the portion of the panoramic video data displayed on the display 104 (e.g., cropped image) may have an aspect ratio that is likely to be used on a viewing device. As a result, an aspect ratio of the portion of the panoramic video data displayed on the display 104 (e.g., cropped image) may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the cropped image 12 may vary based on user preferences.

Pixel coordinates may specify a position within the panoramic image. For example, if the panoramic image has a resolution of 7680 pixels by 1080 pixels, a pixel coordinate of a bottom left pixel in the panoramic image may have pixel coordinates of (0, 0), a pixel coordinate of a top left pixel in the panoramic image may have pixel coordinates of (0, 1080), a pixel coordinate of a top right pixel in the panoramic image may have pixel coordinates of (7680, 1080) and a bottom right pixel in the panoramic image may have pixel coordinates of (7680, 0). Similarly, if the cropped image has a resolution of 1920 pixels by 1080 pixels, a pixel coordinate of a bottom left pixel in the cropped image may have pixel coordinates of (0, 0) in the panoramic image, a pixel coordinate of a top left pixel in the cropped image may have pixel coordinates of (0, 1080) in the panoramic image, a pixel coordinate in a top right pixel in the cropped image may have pixel coordinates of (1920, 1080) in the panoramic image and a bottom right pixel in the cropped image may have pixel coordinates of (1920, 0) in the panoramic image.

Video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the video tags and/or annotation data, thus including in the video summarization the portions of video data (including the objects, angles, and times or the like) indicated by a user 10 and/or determined to be interesting (e.g., priority metric exceeding a threshold) by the server(s) 112. For example, a user 10 may be attending a party and may want to capture the party without being distracted from the party itself. Therefore, the user 10 may locate the image capture device 110 at a central location in a room during the party and may optionally generate tags using the device 102 to identify moments of particular interest to be included in the video summarization. The image capture device 110 may capture video data throughout the party, but the user 10 may generate tags for specific moments or specific guests at the party. The server(s) 112 may generate additional video tags and/or generate a number of video clips using the video tags, where the video clips are associated with a particular time/timestamp, date, and/or position based on the video tags. Additionally or alternatively, the server(s) 112 may determine video clips using annotation data, for example by determining a priority metric for individual video frames in the video data and generating video clips including video frames having a highest priority metric value. The video clips may be ordered chronologically in the video summary, where included video clips are ordered by their relative recording time/timestamp, but the present disclosure is not limited thereto and the server(s) 112 may determine an order of the video clips. The video summarization may also include a collection of still images, in a manner akin to a picture slideshow, where the still images are selected from the video data and may include images that were the subject of tags received as described above.

As part of generating the video summarization, the device 102 may display output video data and may request input from a user 10 of the device 102. For example, the user 10 may instruct the device 102 to generate additional video data (e.g., create an additional video summarization), to modify an amount of video data included in the output video data (e.g., change a beginning time and/or an ending time to increase or decrease a length of the output video data), to modify a portion of the video data included in the output video data (e.g., zoom or pan within the video data), shift a time window associated with a video snippet within the output video data (e.g., change a beginning time of a video snippet without changing the time window), specify an object of interest, specify an event of interest, specify or modify an angle associated with the output video data, increase or decrease a panning speed or the like. Thus, the server(s) 112 may generate the output video data, the device 102 may display the output video data to the user 10 and receive feedback from the user 10 and the server(s) 112 may generate additional or different output video data based on the user input. The video tags may be configured to be similarly modified by the user 10 during a video editing process.

FIG. 2A illustrates an example of panoramic video data according to embodiments of the present disclosure. As illustrated in FIG. 2A, an image capture device 110 may use camera(s) 115 to capture panoramic video data 210 including a panoramic field of view 250. The panoramic video data may include panoramic image 210 having a field of view above 180 degrees and/or an aspect ratio exceeding 2:1. For example, FIG. 2A illustrates the panoramic image 210 corresponding to the panoramic field of view 250 of 360 degrees, with the angle markers shown in dotted lines to correspond to angles relative to the image capture device 110. Such angle markers may or may not be displayed during implementation and are provided here for illustration purposes. The present disclosure is not necessarily limited to panoramic video data and may include any video data, for example video data having a field of view beyond what is normally displayed using a 16:9 aspect ratio on a television. The panoramic image 210 may be generated using one camera or a plurality of cameras without departing from the present disclosure.

While the image capture device 110 may capture video data such as the panoramic image 210, the device 102, the image capture device 110 and/or the server(s) 112 may determine cropped images, such as cropped image 212, for each frame of the video data. By controlling a position of the cropped image 212 within the panoramic image 210, the device 102/image capture device 110/server(s) 112 may effectively crop the video data and generate output video data using a 16:9 aspect ratio (e.g., viewable on high definition televisions without horizontal black bars) that emphasizes desired content within the cropped image 212. However, the present disclosure is not limited to a 16:9 aspect ratio and the aspect ratio may vary.

A position of the cropped image 212 within the panoramic image 210 may be expressed as an angle of view relative to a fixed location of the image capture device 110, such as a front of the image capture device 110. For example, the angle of view may be an azimuth, which is an angular measurement in a spherical coordinate system that describes when a vector from the image capture device 110 to a point of interest is projected perpendicularly onto a reference plane. The angle between the projected vector and a reference vector on the reference plane is called the azimuth. As illustrated in FIG. 2A, the angle of view (e.g., azimuth) for the cropped image 212 is 0 degrees, indicating that the cropped image 212 is at a reference location relative to the image capture device 110, such as in front of the image capture device 110.

FIG. 2B illustrates an example of a user interface including an angle indicator according to embodiments of the present disclosure. As illustrated in FIG. 2B, the device 102 may display the cropped image 212, the panoramic image 210 and an angle indicator 214 on the display 104. The angle indicator may be a visual representation of the angle of view relative to the reference location. The angle indicator 214 may indicate to a user 10 of the device 102 that the cropped image 212 only displays a portion of the overall panoramic image 210 and the position of the cropped image 212 within the panoramic image 210. In addition, a symbol 216 may indicate to the user 10 the portion of the panoramic image 212 included in the cropped image 212. Using the user interface illustrated in FIG. 2B, the user 10 may instruct the device 102 to shift from displaying a first direction (e.g., 0 degrees) in the cropped image 212 to displaying a second direction (e.g., 90 degrees) in the cropped image 212. As a result, the cropped image 212 would be updated to display the second direction, the symbol 216 would be moved within the panoramic image 210 and the angle indicator 214 would change to illustrate the angle associated with the second direction (e.g., 90 degrees).

As discussed above with regard to step 132, the uploaded video data may optionally be annotated by the server(s) 112 to generate annotation data. FIG. 3 illustrates an example of types of annotation data according to embodiments of the present disclosure. As illustrated in FIG. 3, the server(s) 112 may analyze a video frame 310 and generate annotation data 312, which may include time (e.g., a timestamp, a period of time, etc.), a location (e.g., geographic information, GPS coordinates, an address, etc.), motion data (detected motion, camera itself moving, etc.), faces (existence, identification, if smiling, etc.), humans (e.g., head and shoulders), scenes (e.g., indoors, outdoors, outdoor in car, outdoor in nature, outdoor near water, outdoor at sporting event, indoors at concert, indoors at party, etc.), audio (e.g., existence, direction, speech, laughter, applause, keywords, etc.), landmarks (e.g., Eiffel Tower, White House, etc.), objects (flowers, birthday cakes, etc.), pets (e.g., cats, dogs, etc.) and/or directional data (e.g., position of faces, audio, landmarks, objects, pets, etc. within the video frame). In some examples, the annotation data may indicate an area within (e.g., x and y pixel coordinates) the video data that is of interest. For example, the image capture device 110 may capture video data including a first portion (e.g., a stage of a concert or the like) and a second portion (e.g., a back wall opposite the stage), and the annotation data may indicate the area associated with the first portion. Using the annotation data, the server(s) 112 may emphasize the first portion and omit the second portion.

In addition to the annotation data illustrated in FIG. 3, the server(s) 112 may generate additional annotation data. For example, the server(s) 112 may generate emotional data, which may include emotional detection (e.g., determining a mood such as happy, sad, excited, etc.) for an individual, a group of people, the video frame 310 or a combination thereof. As another example, the server(s) 112 may determine if a concert or other event is represented in the video frame 310 and may match the geographic location to the event. For example, the server(s) 112 may determine venues in proximity to the geographic location, events scheduled for the venues and determine if one of the events is represented in the video data. In some examples, the server(s) 112 may detect indications of an event (e.g., detecting a crowd, an amphitheater, a concert hall or the like) and may compare the geographic information to venues in proximity as a result of detecting the indications.

In some examples, the server(s) 112 may perform speech recognition on speech detected in audio associated with the video data to generate output text and may embed the output text in the annotation data. As a first example, the server(s) 112 may include output text corresponding to all of the speech detected in the audio, such as a transcription of a conversation or the like. As a second example, the server(s) 112 may analyze the output text and include a portion of the output text corresponding to key phrases. For example, the server(s) 112 may recognize "Happy Birthday" or a particular name in the output text and include the recognized phrase in associated annotation data.

FIG. 4 is a flowchart conceptually illustrating an example method for generating annotation data according to embodiments of the present disclosure. As discussed above, the annotation data may be generated by the server(s) 112 or a remote device prior to generating the video summarization. For example, the server(s) 112 may generate annotation data upon receiving individual video clips, upon receiving video data or upon receiving a request for a video summarization. For ease of explanation, some of the steps illustrated in FIG. 4 are explicitly depicted as optional, indicated by dashed lines. However, any of the steps illustrated in FIG. 4 may be omitted without departing from the present disclosure. In addition, while the following description refers to the steps illustrated in FIG. 4 being executed by the server(s) 112, some or all of the steps illustrated in FIG. 4 may be executed by the device 102, the image capture device 110, the server(s) 112, a remote device or any combination thereof.

As illustrated in FIG. 4, the server(s) 112 may receive (410) video data and may optionally receive (412) existing annotation data associated with the video data. The server(s) 112 may receive the video data from a remote device (e.g., the device 102, the image capture device 110, a second server(s) 112 or the like) or by accessing the video data on the server(s) 112. The existing annotation data may have been determined by any of the device 102, the image capture device 110, the server(s) 112 and/or a remote device prior to the system receiving the video data in step 410. While video data may include multiple video clips, the video data illustrated in FIG. 4 refers to video data associated with a single video clip (e.g., a video clip captured from a beginning time to an ending time). The server(s) 112 may determine (414) a geographic location associated with the video data, such as a Global Positioning System (GPS) coordinates associated with where the video data was captured. However, the geographic location is not limited to the GPS coordinates and the server(s) 112 may determine a geographic location based on the GPS coordinates. If the video data is captured while in motion (e.g., in a plane, a car or other vehicle), the geographic location may be associated with the beginning time or the ending time of the video data.

The server(s) 112 may determine (416) a current video frame and may identify (418) face(s) present in the video frame. For example, the server(s) 112 may analyze the video frame and identify the face(s) based on facial recognition, identifying head and shoulders, identifying eyes, smile recognition or the like. Optionally, the server(s) 112 may determine (420) identities associated with the face(s). For example, the server(s) 112 may employ facial recognition and a database of identities, such as social networking database, to determine the identities. In some examples, the video data will be tagged with identities of faces represented in the video data. Thus, the server(s) 112 may determine the identity of a face in a video frame from a list of identities associated with the video data.

The server(s) 112 may identify (422) object(s) present in the video frame. For example, the server(s) 112 may identify object(s) such as physical objects (e.g., flowers, toys, clothing or the like), animals (e.g., pets such as cats, dogs, wildlife or the like), vehicles (e.g., cars, airplanes, or the like) or the like. Optionally, the server(s) 112 may determine (424) object(s), which may include determining a type of object, a brand of the object, a name for the object or the like. Thus, whereas step 422 identifies an existence of the object in the video frame, step 424 identifies an identity of the object or otherwise recognizes what the object is. The server(s) 112 may determine (426) famous landmarks (e.g., Big Ben, a famous cathedral, monument or the like) represented in the video frame based on the geographic location. For example, the geographic location may be in proximity to a monument and the server(s) 112 may identify the monument within the video frame.

The server(s) 112 may determine (428) motion data, including motion data associated with the image capture device (e.g., movement of the image capture device while capturing the video data) and objects represented in the video data (e.g., movement of an object relative to the image capture device). The server(s) 112 may determine (430) an existence of particular audio waveforms in audio data associated with the video data. For example, the server(s) 112 may identify an existence of speech, laughter, applause or the like. In some examples, as discussed in greater detail below with regard to FIG. 9, the server(s) 112 may identify music in the audio data. The server(s) 112 may determine (432) a scene associated with the video frame. For example, the server(s) 112 may determine if the video frame was captured indoors or outdoors and may determine other characteristics that may be useful in determining a scene associated with the video frame. Finally, the server(s) 112 may update (434) the annotation data associated with the video frame and increment (436) video frame(s) (e.g., one video frame, several video frames or the like) and repeat steps 416-434. For example, the server(s) 112 may increment video frames linearly to update annotation data for video frames in the video data by one or at a fixed increment. Additionally or alternatively, the server(s) 112 may increment the video frame(s) nonlinearly to focus on annotating interesting frames, which may be determined based on a low resolution preview or other techniques. Thus, the server(s) 112 may determine an amount to increment each time step 436 is performed and the amount to increment may vary without departing from the present disclosure.

In addition to using annotation data to generate video summarizations, the server(s) 112 may use the annotation data for additional functionality. As a first example, the server(s) 112 may extract information about a user 10 from the annotation data and may use the extracted information to target advertisements to the user 10. As a second example, the server(s) 112 may collect annotation data from a plurality of users and/or video clips to collate information. Thus, the server(s) 112 may create a database of annotation data and may use the database to identify trends, brands or the like from video data from a variety of sources.

Figure 5B:

FIGS. 5A-5H illustrate examples of annotation data according to embodiments of the present disclosure. As illustrated in FIG. 5A, the server(s) 112 may store annotation data in an annotation database 510. The annotation database 510 may include the annotation data discussed above (e.g., time, location, motion, faces, humans, scenes, audio, landmarks, objects, pets, directional data, etc.) for individual video frames. As illustrated in FIG. 5A, the annotation database 510 includes Frame 1, Frame 2, Frame 3, Frame 10, Frame 11, Frame 30 and Frame 35, although the annotation database 510 may include any number of video frames and is not limited to the example illustrated in FIG. 5A. In some examples, the annotation database 510 may include an entry for individual video frames included in video data (e.g., every video frame has an entry). In other examples, the annotation database 510 may include an entry every fixed number of video frames (e.g., 5th, 10th, 15th etc.). In some examples, the annotation database 510 may include an entry whenever the annotation data changes (e.g., annotation data is associated with intervening video frames until a following entry in the annotation database 510). Additionally or alternatively, the annotation database 510 may include an entry for select video frames without departing from the present disclosure. For example, the server(s) 112 may determine a priority metric (discussed below) for individual video frames and store the annotation data associated with individual video frames having a priority metric exceeding a threshold. Other techniques for storing annotation data may also be used.

The server(s) 112 may determine the priority metric (e.g., interesting score) using the annotation data. For example, the server(s) 112 may use an algorithm or other technique to calculate the priority metric based on objects included in the video frame or other characteristics of the video frame. The priority metric may be used to generate video clips and/or to rank individual video frames. For example, the server(s) 112 may determine first video frames associated with priority metrics exceeding a threshold and may group first video frames in proximity to generate a video clip. As an example, the server(s) 112 may determine that Frames 1-11 are associated with priority metrics exceeding the threshold and may generate a video clip including Frames 1-11.

The annotation database 510 illustrated in FIG. 5A may include video frames for multiple clips included in the video data. However, the disclosure is not limited thereto and FIG. 5B illustrates an annotation database 512 for an individual video clip. As illustrated in FIG. 5B, the annotation database 512 includes Frame 1, Frame 2, Frame 3, Frame 10, Frame 11, Frame 30 and Summary Data associated with the overall video clip. The annotation database 512 includes a series of columns corresponding to annotation data that is included in the video clip and indicates whether the annotation data is represented in each video frame. For example, Face 1 is represented in Frame 1, Frame 2, Frame 3, Frame 10, Frame 11 and Frame 30, while Face 3 is only represented in Frame 11 and Frame 30. Thus, the annotation database 512 may indicate the annotation data associated with individual video frames.

The summary data may include statistics for the video clip that are unique to the particular video clip. For example, the summary data may include a frame selector statistic identifying transitions within the video clip (e.g., grouping the video frames based on a similarity index) or the like. Additionally or alternatively, the summary data may include video "fingerprints" that indicate characteristics of the video clip that may be used to identify similar video clips. For example, the characteristics of the video clip may include feature vectors, histograms of image data, gradients of the image data, histograms of gradients, a signature of the image data or the like that may be used to determine if image data is similar between video clips.

While the annotation database 512 illustrated in FIG. 5B lists individual frames for the video clip, video frames may be grouped together as illustrated in the annotation database 514 illustrated in FIG. 5C. For example, the annotation database 514 groups Frames 1-200, Frames 350-600, Frames 800-1200, Frames 1500-1650 and Frames 2000-2200, Frames 2400-2550. The annotation database 514 may group the video frames based on annotation data and/or the frame selector statistic for the overall video clip.

FIG. 5D illustrates a Master Clip Table (MCT) 520 that includes Clips 1-7. The MCT 520 may indicate which frames are associated with a video clip (e.g., Clip 1 may be associated with Frames 1-450, which corresponds to a 15 second video clip at 30 frames per second), a priority metric associated with the video clip, summary data (as discussed above with regard to FIG. 5B) associated with the video clip and/or a time/position of interesting moments within the video clip (e.g., pixel coordinates associated with individual timestamps corresponding to the moment).

In some examples, the user 10 may generate a video clip, which may be included in the MCT 520 with or without annotation data. The server(s) 112 may annotate the user-generated video clip, although the present disclosure is not limited thereto. A moment may be a bounding box around an interesting object or section of the video clip over time. Additional data may be included about a moment, such as a per-frame interest rating, a position of a detected face, an identity of a detected face or the like.

The server(s) 112 may generate the MCT 520 based on priority metrics determined from the annotation data. The server(s) 112 may determine a priority metric associated with each video frame in the video data, with individual video frames (e.g., selected video frames based on content represented in the selected video frames), with groups of video frames (e.g., tracks or moments) and/or with video clips. For example, the server(s) 112 may determine first priority metrics associated with individual video frames to determine interesting portions of the video data. Using the annotation data, the server(s) 112 may identify transitions within the video data (e.g., tracks), may group interesting video frames based on the transitions to determine moments and may determine second priority metrics associated with individual moments. The server(s) 112 may then extract video clips including interesting moments and may determine third priority metrics associated with individual video clips. Thus, the server(s) 112 may identify the most interesting video frames, may identify moments including the most interesting video frames and may generate video clips including the most interesting moments. The server(s) 112 may compare the priority metrics to each other (e.g., relative priority metrics) or to a global threshold (e.g., absolute priority metrics) to generate the MCT 520.

In some examples, the MCT 520 may include every video clip included in the video data (e.g., the video data is segmented into sequential video clips, each of which is included in the MCT 520), but the disclosure is not limited thereto and the MCT 520 may include only a portion of the video clips (e.g., interesting video clips associated with a portion of the video data). While the MCT 520 illustrated in FIG. 5D includes video clips associated with a single sequential stream of video data (e.g., video captured at one time), the disclosure is not limited thereto. Instead, a MCT 522 may include video clips associated with multiple streams of video data (e.g., video captured at more than one time, such as separate recordings) as illustrated in FIG. 5E. As illustrated in FIG. 5E, the MCT 522 includes Clips 1-4 captured at a first time (e.g., capture date of Sep. 15, 2015) and Clips 50-52 captured at a second time (e.g., capture data of Sep. 24, 2015). Additionally or alternatively, the MCT 522 may include video clips from separate recordings on the same date (e.g., first video recording at one point on Sep. 15, 2015, second video recording at a later point on Sep. 15, 2015) and/or video clips captured by multiple image capture devices 110 without departing from the disclosure.

Figure 5F:
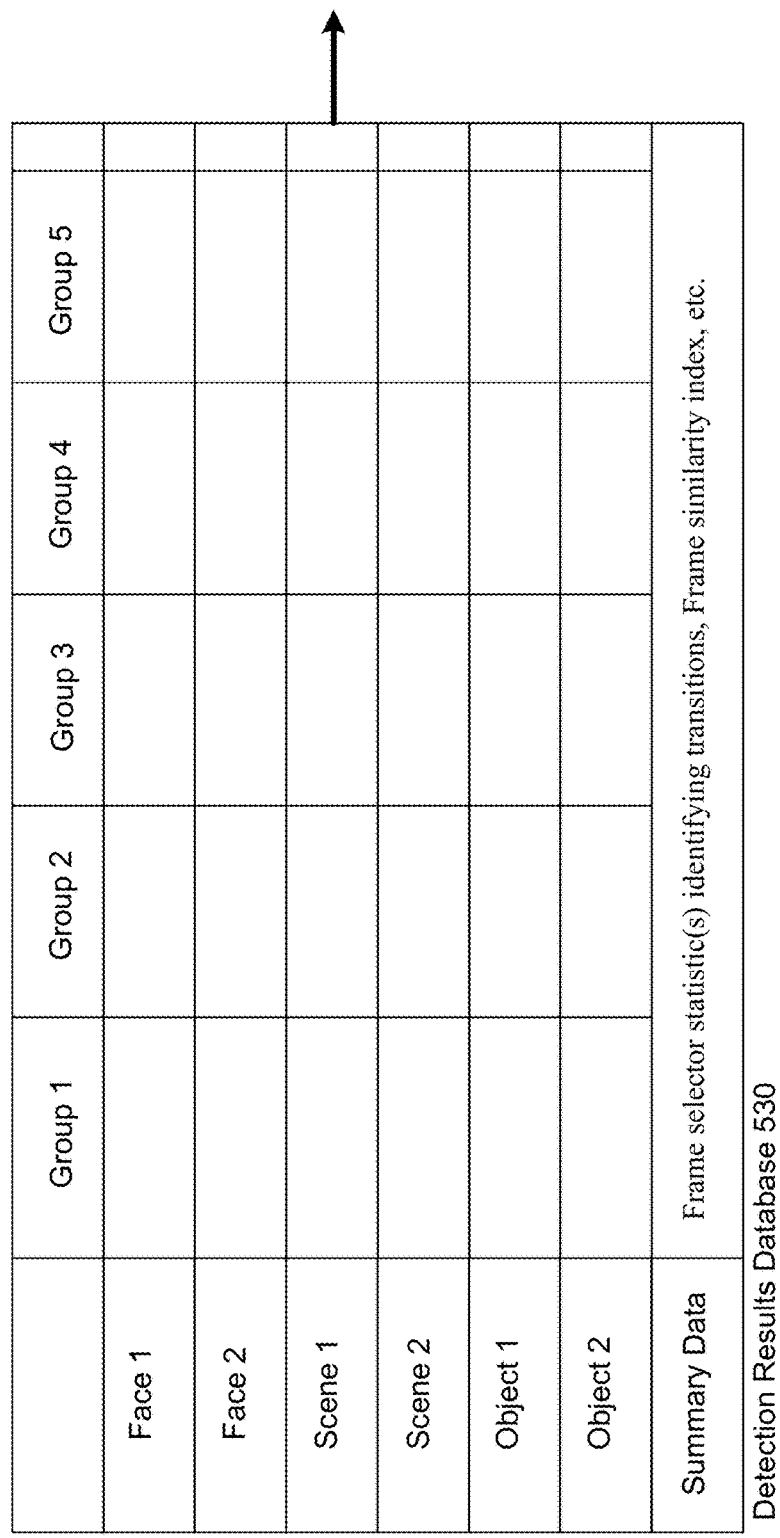

FIG. 5F illustrates a detection results database 530. Instead of including individual rows for individual video frames or groups of video frames, the detection results database 530 includes individual rows for annotation data and indicates groups of video frames including the annotation data. For example, Face 1 may be associated with a first group of video frames (e.g., frames 1-150), a second group of video frames (e.g., frames 600-900), a third group of video frames (e.g., frames 1500-2000) etc. Thus, the detection results database 530 indicates individual sections of the video data associated with the annotation data. Additionally or alternatively, the detection results database 530 may indicate multiple groups of video frames in a single column without departing from the disclosure.

FIG. 5G illustrates a face database 540 including a list of unique faces represented in the video data and indicating which video clips are associated with each of the individual faces. The server(s) 112 may analyze individual video clips using facial recognition (e.g., a facial recognition engine or the like) using Face Feature Vectors (which includes information that characterizes the appearance of individual faces under various poses and/or illuminations), may identify unique faces within each of the video clips, and may determine if the same face is detected in multiple video clips. For example, Face 1 is represented in Clip 1, Clip 2 and Clip 5 but not represented in Clip 3 and Clip 4. The server(s) 112 may include one or more images associated with individual faces (stored in the Face Feature Vector), or may access a database with images of individual faces in different poses. In some examples, an identity of an individual face may be determined (e.g., based on user input or using facial recognition processing) and stored in the face database 540. In some examples, a first unique face represented in first video clips may be associated with a second unique face represented in second video clips and the information may be combined in the face database 540. For example, a user 10 may be identified as a first unique face (e.g., Face 1 represented in Clips 1, 2 and 5) and a second unique face (e.g., Face 4 represented in Clip 3). Using identity information, user input, updated facial recognition processing or additional video data, the server(s) 112 may determine that the first unique face and the second unique face are associated with the user 10 and may merge Face 1 and Face 4. Thus, the face database 540 may be updated over time based on subsequent processing. While FIG. 5G illustrates the face database 540 indicating video clips associated with individual faces, the disclosure is not limited thereto and the face database 540 may indicate video frames associated with the individual faces without departing from the disclosure.

FIG. 5H illustrates an example of a video clip annotated with two moments, which are tracked over the course of the video clip. As illustrated in FIG. 5H, a video clip 530 may be 10 seconds long and may include a field of view of 360 degrees. In a first video frame (e.g., Frame 1), a first person 11-1 is at a first position and a second person 11-2 is at a second position. As the video clip progresses, the first person 11-1 travels in a first direction towards the second position and the second person 11-2 travels in a second direction towards the first position. The first person 11-1 and the second person 11-2 meet in a third video frame (e.g., Frame 3) and, remaining in proximity to each other, both move in the first direction (e.g., Frame 5 and Frame 6). The server(s) 112 may annotate the video clip 530 with two moments, a first moment 532-1 associated with the first person 11-1 (e.g., bounding box surrounding the first person 11-1) and a second moment 532-2 associated with the second person 11-2 (e.g., bounding box surrounding the second person 11-2). In some examples, the server(s) 112 may annotate the video clip 530 with a third moment indicating positions and/or video frames where the first person 11-1 and the second person 11-2 are in proximity. For example, the third moment may be a bounding box including the first person 11-1 and the second person 11-2 in Frames 3-6.

The server(s) 112 may select video clips from the video data based on priority metrics. As an illustrative example, the server(s) 112 may generate priority metric graphs representing the individual priority metrics and may select a video clip from the video data corresponding to a peak in the priority metric graph. FIG. 6 illustrates examples of priority metric graphs according to embodiments of the present disclosure. As illustrated in FIG. 6, the video data 610 extends from a begin time (e.g., 0 seconds) to an end time (e.g., 30 seconds). The video data 610 may correspond to a video segment (e.g., video segment including multiple video clips) and/or a video clip. Using annotation data associated with the video data 610 (or generating the annotation data from the video segment and/or video clip itself), the server(s) 112 may generate a first priority metric graph 620-1 and/or a second priority metric graph 620-2. For example, the server(s) 112 may retrieve existing priority metrics stored in the annotation data and/or may generate the priority metrics using the annotation data.

As illustrated in FIG. 6, a first priority metric graph 620-1 is illustrated as a bar graph including individual bars corresponding to individual priority metric values. A priority metric value may be associated with a single video frame or a series of video frames, in which case the bars included in the first priority metric graph 620-1 may be determined using quantization. For example, the server(s) 112 may segment the video frames and determine individual priority metric values corresponding to individual segments, reducing a computational load and/or smoothing the first priority metric graph 620-1. A second priority metric graph 620-2 is illustrated as a line chart based on the individual priority metric values, which may also be associated with a single video frame or a series of video frames. The second priority metric graph 620-2 may indicate raw priority metric values or may be a mathematical function (e.g., line of best fit) determined based on the raw priority metric values, for example to smooth the data. While FIG. 6 illustrates the priority metric graphs 620 using a bar chart and a line chart, the present disclosure is not limited thereto and the server(s) 112 may generate the priority metric graphs 620 using any techniques known to one of skill in the art without departing from the disclosure. Additionally or alternatively, the server(s) 112 may determine peaks from individual priority metric values associated with the video data 610 without generating a priority metric graph 620 without departing from the disclosure.

The priority metric graphs 620 indicate a priority metric value associated with individual video frames included in the video data 610. For example, the priority metric graphs 620 may include a priority metric value corresponding to each video frame included in the video data 610, an average of every n video frames (where n is a natural number), a sampling every n video frames, and/or a variable sampling (e.g., based on motion data, changes to the annotation data or the like), although the present disclosure may vary. As illustrated in priority metric graphs 620, the priority metric values vary over time, with relative peaks (e.g., the 2 second mark, the 6 second mark, the 12 second mark, the 18 second mark, the 22 second mark, 26 second mark and the 30 second mark) and intervening valleys.

The server(s) 112 may identify the relative peaks using mathematical techniques known to one of skill in the art. In some examples, the server(s) 112 may determine a threshold to identify relative peaks that are interesting (e.g., highest peaks, above average peaks or the like). For example, the server(s) 112 may calculate a threshold (e.g., a horizontal line associated with a fixed priority metric value) and determine relative peaks exceeding the threshold. The server(s) 112 may calculate the threshold as a global threshold (e.g., universal threshold for multiple video segments/video clips included in the video data), a local threshold (e.g., individual threshold associated with a single video segment/video clip) or a variable threshold (e.g., variable threshold based on the average priority metric value within a range (e.g., time window). For example, the server(s) 112 may determine a fixed threshold (not shown) for the video data 610 and may determine the relative peaks exceeding the fixed threshold (e.g., the 6 second mark, the 12 second mark, 26 second mark and the 30 second mark). Thus, the server(s) 112 may identify four moments of interest in the video data 610 and may generate one or more video snippets from the moments of interest.

In some examples, the priority metric graphs 620 may not be as smooth as the examples illustrated in FIG. 6 and the server(s) 112 may need to identify spikes in the priority metric graphs 620. A spike in the priority metric graph 620 may indicate a series of video frames that are interesting relative to neighboring video frames, corresponding to a brief moment of interest that may be extracted as a video snippet. For example, in some examples a peak in the priority metric graph 620 may correspond to an interesting moment but may extend for a relatively long period of time (e.g., 4+ seconds), which may be difficult to extract as a video snippet (e.g., the interesting aspect of the peak extends over time and truncating the peak to generate a video snippet removes proper context). In contrast, a short peak (e.g., spike) may extend for a relatively short period of time (e.g., 1-2 seconds) and may retain context as a video snippet. To identify spikes in the priority metric graph 620, the server(s) 112 may use a variable threshold. Thus, instead of using a fixed threshold associated with the video data 610 from 0 seconds to 30 seconds, the server(s) 112 may divide the video data 610 into multiple sections and determine individual thresholds associated with each section. For example, the server(s) 112 may divide the video data 610 into fixed sections based on time (e.g., from 0 seconds to 10 seconds, 10 seconds to 20 seconds, etc.), multiple variable sections based on peaks (e.g., from first peak to second peak, from second peak to third peak, etc.), multiple variable sections including portions of the valleys (e.g., beginning of first valley to end of first valley, beginning of second valley to end of second valley, etc.) or the like. Additionally or alternatively, the server(s) 112 may determine the threshold using a running average (e.g., average priority metric values over 5 seconds) or the like to determine where the priority metric graph 620 spikes relative to surrounding video frames.

Figure 7C:
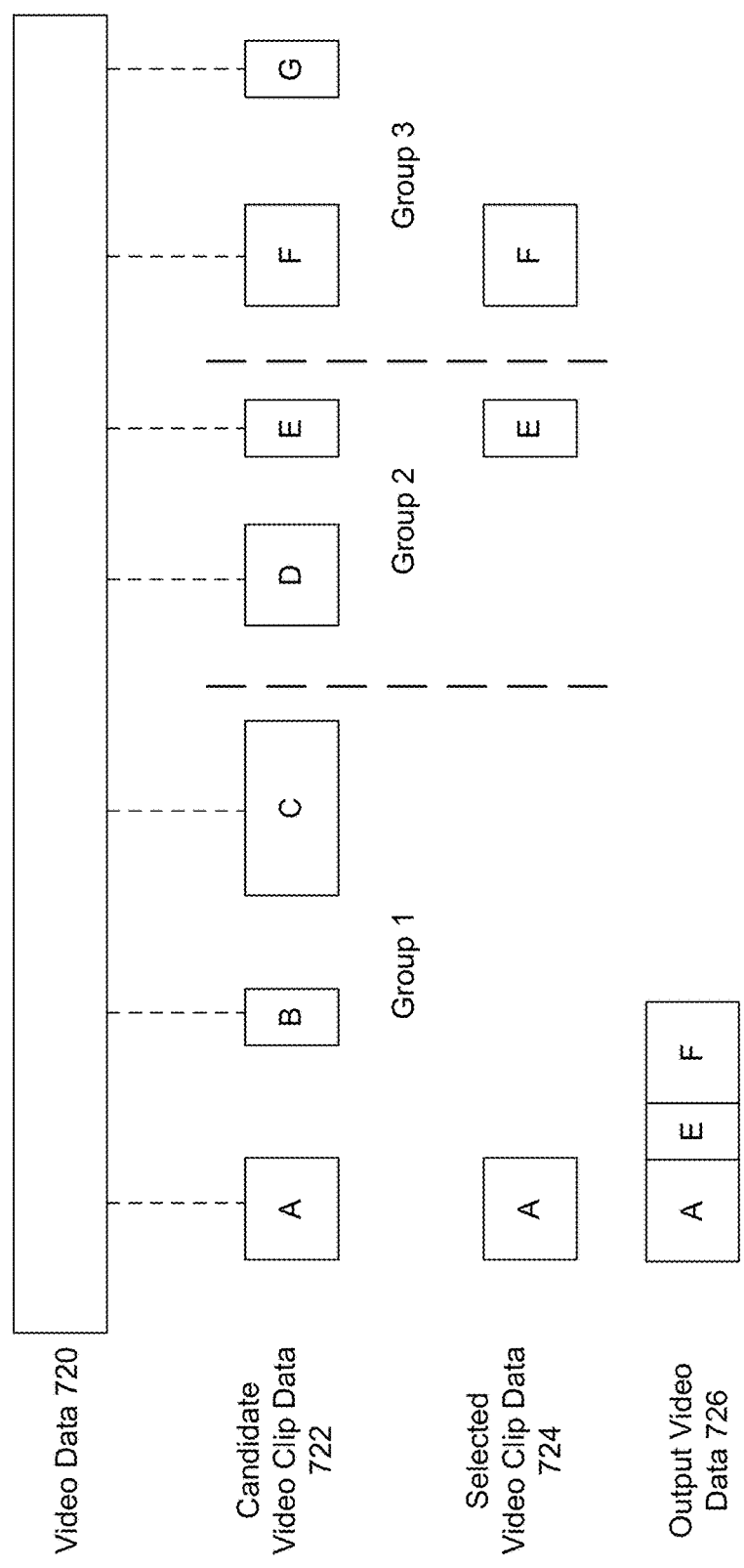

As discussed above with regard to step 134, the server(s) 112 may generate a video summarization including a portion of the uploaded video data based on the annotation data. FIGS. 7A-7C illustrate examples of generating video summarizations according to embodiments of the present disclosure. As illustrated in FIG. 7A, tags 708 may be associated with specific moments within first video data 710-1, and the server(s) 112 may use the tags 708 to determine video clip data 712 associated with each of the tags 708. The server(s) 112 may then generate output video data 714 including at least portions of the video clip data 712.

To illustrate examples of different tags, FIG. 7A illustrates a forward tag 708-10, a backward tag 708-12, a begin tag 708-14, an end tag 708-16 and a window tag 708-18. The forward tag 708-10 is associated with a forward looking command, such as when the server(s) 112 determines that there is a moment of interest in the near future. The video clip data 712-A associated with the forward tag 708-10 may extend between a beginpoint, such as a timestamp associated with the forward tag 708-10, and an endpoint subsequent to the beginpoint. The server(s) 112 may determine the endpoint based on the theme, the annotation data, user preferences and/or user input associated with the forward tag 708-10. For example, the server(s) 112 may determine the endpoint based on annotation data, a priority metric included in the annotation data falling below a threshold, a fixed duration of time for all forward tags, a variable duration of time specified by the forward tag 708-10, an audio energy level of audio data associated with the first video data 710-1 falling below a threshold, when no movement is detected in the first video data 710-1 for a duration of time or the like. Thus, the forward tag 708-10 may begin at a first moment in time and may extend until a second moment in time. The period between the first moment in time and the second moment in time may be preconfigured (for example, 30 seconds) and/or may be adjustable.

The backward tag 708-12 is associated with a backward command, such as when the server(s) 112 identifies that a moment of interest recently occurred. The video clip data 712-B associated with the backward tag 708-12 may extend between a beginpoint, prior to a timestamp associated with the backward tag 708-12, and an endpoint subsequent to the timestamp. The server(s) 112 may determine the beginpoint based on the theme, the annotation data, user preferences and/or user input associated with the backward tag 708-12. For example, the server(s) 112 may determine the beginpoint based on annotation data, a priority metric included in the annotation data exceeding a threshold, a fixed duration of time for all backward tags, a variable duration of time specified by the backward tag 708-12, an audio energy level falling below a threshold immediately prior to the timestamp associated with the backward tag 708-12, when no movement was detected in the first video data 710-1 for a duration of time immediately prior to the timestamp associated with the backward tag 708-12 or the like. Similarly, the server(s) 112 may determine the endpoint as discussed above or using the timestamp associated with the backward tag 708-12. Thus, the backward tag 708-12 may begin at a first moment in time prior to when the backward tag 708-12 was received and may extend until a second moment in time, such as when the backward tag 708-12 was received. The period between the first moment in time and the second moment in time may be preconfigured (for example, 30 seconds) and/or may be adjustable.

The begin tag 708-14 and the end tag 708-16 are associated with a start/stop command, respectively, such as when the server(s) 112 identifies a beginning and an end of a moment of interest. The video clip data 712-C may extend between a beginpoint associated with the begin tag 708-14 and an endpoint associated with the end tag 708-16. While the beginpoint is associated with the begin tag 708-14, the beginpoint is not limited to a timestamp associated with the begin tag 708-14. Instead, the server(s) 112 may determine the beginpoint as discussed above, with the begin tag 708-14 being used as a rough estimate of the beginpoint. Similarly, the endpoint is not limited to a timestamp associated with the end tag 708-16. Instead, the server(s) 112 may determine the endpoint as discussed above, with the end tag 708-16 being used as a rough estimate of the endpoint.

The window tag 708-18 is associated with a window command, such as when the server(s) 112 wants to capture a number of images surrounding a particular moment in time. For example, the server(s) 112 may select a number of images before a timestamp of the command and the same number of images after the timestamp of the command to create a window of video clip data 712-D, centered on the timestamp. Alternatively, the window tag/command may be of a "snapshot" variety, where the window comprises just a single image, where the single image is associated with the timestamp of the command. Thus, the video clip data 712-D may be a single frame or image shown for a duration of time. The single frame may be captured based on the window tag 708-18, such as the timestamp associated with the window tag 708-18, although the present disclosure is not limited thereto. The server(s) 112 may determine the duration of time based on the theme, annotation data, user preferences and/or user input. While FIG. 7A illustrates several examples of tags 708, the disclosure is not limited thereto and the tags 708 may vary. In addition, the server(s) 112 may receive multiple tags 708 of each type and/or tags 708 from multiple users without departing from the disclosure.

To illustrate that the video summarization may include video clips captured on different dates and/or from different image capture devices 110, FIG. 7B illustrates second video data 710-2 including a first portion captured on a first date (e.g., Sep. 15, 2015) and a second portion captured on a second date (e.g., Sep. 24, 2015). The server(s) 112 may generate the video clip data 712 from the second video data 710-2 and may generate the output video data 714 using the video clip data 712.

In some examples, the server(s) 112 may determine candidate video clips and may select a portion of the candidate video clips to include in a video summarization based on similarities between the candidate video clips. Thus, the server(s) 112 may improve a diversity across video clips and avoid having similar video clips included in the video summarization. As illustrated in FIG. 7C, the server(s) 112 may determine candidate video clip data 722 (e.g., video clips A-G) from video data 720 based on annotation data, for example using priority metrics associated with individual video clips. The server(s) 112 may then compare the candidate video clip data 722 using a similarity matrix to identify similar content (e.g., video clips having high affinity with respect to certain attributes/characteristics). For example, the server(s) 112 may determine if two video clips are similar in terms of color characteristics, number of faces, motion data, etc., which may be indicated by the similarity matrix (e.g., a two dimensional array indicating a similarity between the two video clips).

As illustrated in FIG. 7C, the server(s) 112 may group similar video clips as Group 1 (e.g., video clips A-C), Group 2 (e.g., video clips D-E) and Group 3 (e.g., video clips F-G). To improve a diversity across video clips, the server(s) 112 may select a single video clip from each group. In some examples, the server(s) 112 may select the video clip from each group having the highest priority metric for the group. For example, the server(s) 112 may determine selected video clip data 724 including video clip A from Group 1, video clip E from Group 2 and video clip F from Group 3. Therefore, the output video data 726 may include video clips A, E and F.

In some examples, multiple video clips from a first group may have priority metrics exceeding video clips from a second group. For example, video clips A, B and C in Group 1 may each have a priority metric higher than priority metrics associated with video clips D and E in Group 2. When the server(s) 112 selects the selected video clip data 724 using priority metrics alone, the output video data 726 may include video clips A, B and C. However, when the server(s) 112 selects the selected video clip data 724 using priority metrics and similarity matrices, the output video data 726 may exclude video clips B and C due to their similarity to video clip A, despite video clips B and C having higher priority metrics than video clips D and E.

In order for the server(s) 112 to annotate the video data and generate a video summarization, the image capture device 110 must upload the video data to the server(s) 112. FIG. 8 illustrates an example of uploading and processing individual video sections to improve a latency associated with annotating the video data according to embodiments of the present disclosure. For example, an image capture device 110 may upload raw video data to the server(s) 112 for the server(s) 112 to perform additional processing, such as generating annotation data, generating a master clip table, combining the raw video data and generating panoramic video data, etc. As illustrated in FIG. 8, the image capture device 110 may divide the video data into sections and upload individual sections to the server(s) 112, enabling the server(s) 112 to annotate (e.g., generate annotation data) the uploaded sections prior to receiving the entirety of the video data. Thus, by annotating individual video sections as they are uploaded, the server(s) 112 may reduce a latency associated with the annotating (as perceived by a user 10) as the server(s) 112 only have to annotate a portion of the video data after a final video section is uploaded.

As illustrated in FIG. 8, an image capture device 110 may capture video data 810 and may divide the video data 810 into video sections 820 (e.g., video sections A-Z). Although the video sections 820 in FIG. 8 are illustrated as separate sections with vertical lines delineating video section demarcations, the video data may be received in a non-delineated form (for example, as part of a continuing video stream of incoming video data). Thus, the vertical lines in the video sections 820 are included only for illustrative purposes to illustrate the relationship between the video sections 820 to the video data 810. While the video data 810 illustrated in FIG. 8 is illustrated as being complete (e.g., video capture has ended), the present disclosure is not limited thereto. Instead, the image capture device 110 may continue capturing video data 810 and may perform the illustrated processing on individual video sections as the video data is captured.

At a first time, illustrated by video sections 820-1, the image capture device 110 may begin uploading a first video section A to the server(s) 112, a dotted line indicating that the first video section is being uploaded. While the image capture device 110 stores all of the video sections 820 at the first time, the server(s) 112 have only received the first section A.

At a second time, illustrated by video sections 820-2, the image capture device 110 may have finished uploading the first video section A (indicated by the light shading) and may begin uploading a second video section B (indicated by the dotted line). At the second time, the server(s) 112 may have received the first video section A (also indicated by the light shading) and may begin annotating the first video section A (indicated by diagonal hatching) while uploading the second video section B (also indicated by the dotted line). This process may continue, with individual video sections being uploaded to the server(s) 112 and the server(s) 112 annotating the uploaded video sections, until a final video section is uploaded to the server(s) 112, indicating that the video capturing is complete.

For example, at a third time illustrated by video sections 820-3, the image capture device 110 has completed uploading a final video section Z, as indicated by the light shading. At the third time, the server(s) 112 may have received an entirety of the video data (e.g., video sections A-Z), may have annotated a majority of the video sections 1020 (e.g., video sections A-Y), as indicated by the dark shading, and may begin annotating the final video section Z, as indicated by the diagonal hatching.

Therefore, while the image capture device 110 uploaded the video sections 1020 to the server(s) 112, the server(s) 112 may have annotated a portion of the video sections 820 (e.g., video sections A-Y) and may be annotating the remaining video sections (e.g., video section Z). Thus, instead of receiving the entirety of the video data 810 at the third time and subsequently annotating the video data 810, the server(s) 112 may receive a final video section and have already begun/completed annotating the remaining video sections. Therefore, a perceived latency between the video data 810 being uploaded and the annotation being complete may be reduced.

Typically, the image capture device 110 may capture (910) video data and upload (910) the video data to the server(s) 112, as illustrated in FIG. 8. While uploading individual video sections may allow the server(s) 112 to begin annotating the individual video sections prior to receiving the final video section, thus reducing the perceived latency, the server(s) 112 may not need portions of the video data and the final video section may require more annotation time than a previously uploaded video section. For example, if a first portion of the video data is relatively static (e.g., infrequent motion data, constant scene, limited number of faces etc.) and a second portion of the video data is relatively dynamic (e.g., frequent motion data, changing scenes, multiple faces, etc.), the server(s) 112 may require more time to annotate the second portion than the first portion. By uploading the video data chronologically, the server(s) 112 may not begin annotating the second portion until receiving the first portion in its entirety. Therefore, uploading the video data in its entirety and chronologically may be inefficient for subsequent annotation/video summarization performed by the server(s) 112.

Figure 9:
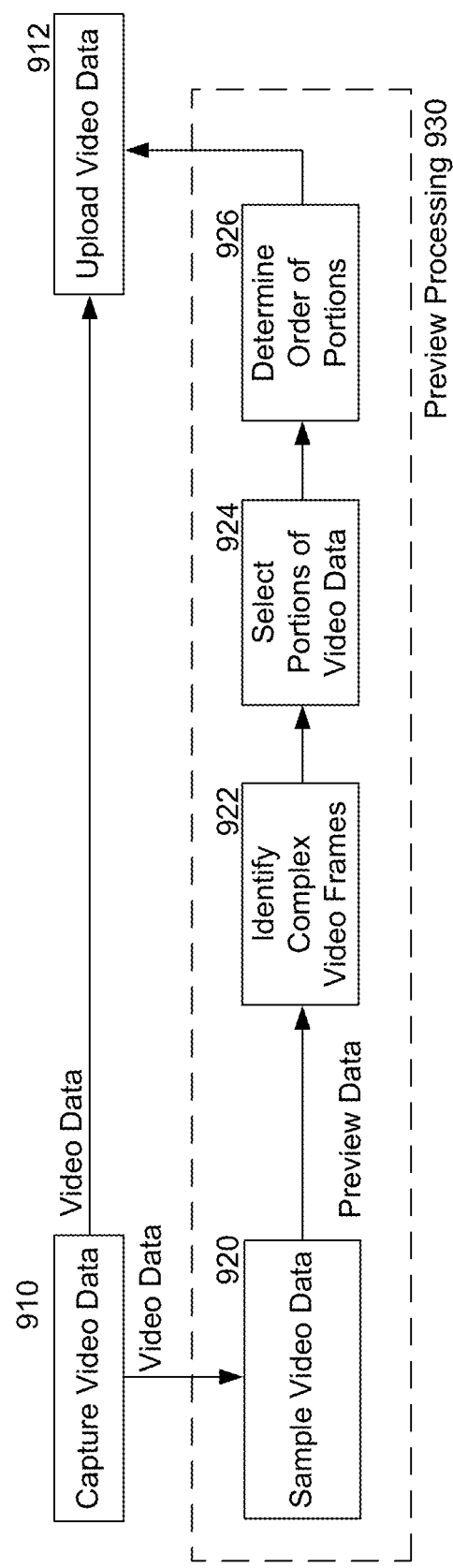
FIG. 9 illustrates an example of preview processing according to embodiments of the present disclosure.

FIG. 9 illustrates an example of preview processing according to embodiments of the present disclosure. To reduce the perceived latency between beginning to upload the video data and annotation being complete and/or receiving a video summarization, the system 100 may perform preview processing 930 to select portions of the video data to upload and/or determine an order with which to upload the video data. For example, if the second portion is uploaded prior to the first portion, the server(s) 112 may begin annotating the second portion while the first portion is uploaded, thus reducing the perceived latency as the first portion requires less annotation time. Additionally or alternatively, to further reduce the perceived latency the first portion may not be uploaded or may be uploaded at a later point in time if it is not included in the video summarization.

As illustrated in FIG. 9, the preview processing 930 may sample (920) the video data to generate preview data. As discussed above, the video data may have a first sampling frequency (e.g., 30 frames per second) and the sampled video data may have a second sampling frequency (e.g., 1 frame per second), although the disclosure is not limited thereto. By sampling the video data, the preview data may provide the system 100 with information about an entirety of the video data without requiring the video data to be uploaded. In addition to the sample video data, the preview data may include audio data, annotation data (including video tags) or the like. The preview processing 930 may identify (922) complex video frames (e.g., using complexity metrics) in the video data using the preview data, may select (924) portions of the video data and may determine (926) an order of the portions of the video data. For example, the preview processing 930 may filter redundant data to avoid similar looking video frames, selecting portions of the video data having complex data and ordering the portions of the video data based on a complexity of the video data. Thus, instead of uploading the video data in its entirety and chronologically in step 912, the system 100 may upload the selected portions of the video data in the order determined by the preview processing 930.

The preview processing 930 may be performed by the image capture device 110, the server(s) 112, the device 102 or a combination thereof. For example, the image capture device 110 may generate the preview data and upload the preview data to the server(s) 112 and the server(s) 112 may identify the complex moments, select the portions of the video data and determine the order with which to upload the portions of the video data. The server(s) 112 may send a list of the selected portions and the order to the image capture device 110 and the image capture device 110 may upload the selected portions of the video data to the server(s) 112 based on the order. However, the present disclosure is not limited thereto and the image capture device 110 may perform at least portions of steps 922-926 without departing from the present disclosure. For example, the image capture device 110 may sample the video data and may perform computer vision (CV) processing on the sampled video data to select the portions of the video data to upload and determine the order to upload the portions of the video data. Additionally or alternatively, the image capture device 110 may identify transitions within the video data, may upload portions of the video data corresponding to the transitions to the server(s) 112 and the server(s) 112 may request additional video data based on the uploaded portions of the video data.

After the video data is uploaded, the server(s) 112 may annotate the video data as discussed above with regard to step 132 and may generate a video summarization or other curation as discussed above with regard to step 134. Therefore, a perceived latency between a first time when the user 10 begins uploading the video data and a second time when the user 10 receives a video summarization is based on three separate time delays; an upload time, an annotation time and a curation time.

Figure 10:
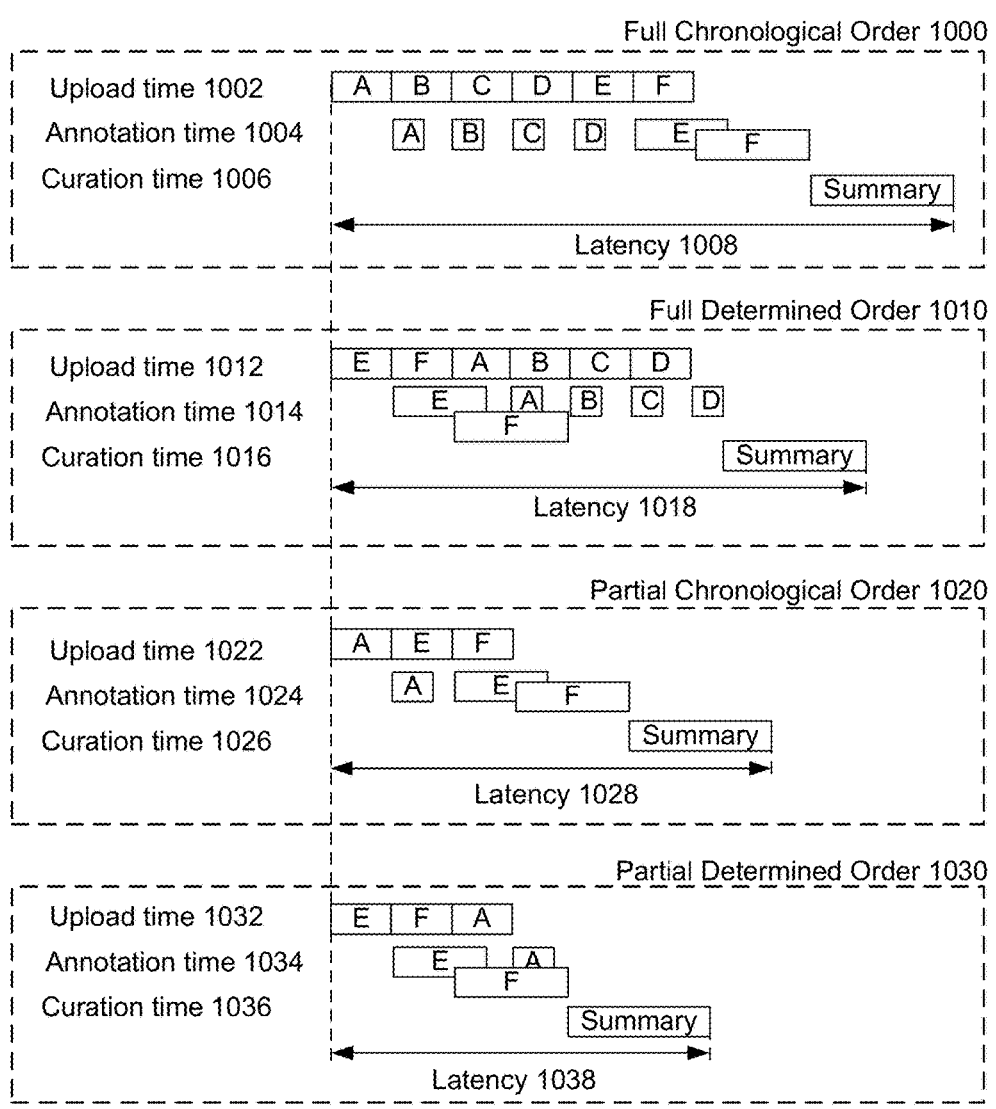
FIG. 10 illustrates examples of latencies corresponding to preview processing according to embodiments of the present disclosure.

FIG. 10 illustrates examples of latencies corresponding to various preview processing according to embodiments of the present disclosure. As illustrated in FIG. 10, the video data may be uploaded using one of four techniques, although the disclosure is not limited thereto. For example, a first technique includes uploading the video data in full chronological order 1000 (e.g., uploading an entirety of the video data in chronological order), a second technique includes uploading the video data in full determined order 1010 (e.g., uploading the entirety of the video data in an order determined by the system 100), a third technique includes uploading the video data in partial chronological order 1020 (e.g., uploading a portion of the video data in chronological order) and a fourth technique includes uploading the video data in partial determined order 1030 (e.g., uploading a portion of the video data in an order determined by the system 100).

Typically, video data is uploaded using the first technique, in full chronological order 1000 as illustrated in FIG. 8. As the system 100 doesn't know which portion of the video data is interesting and/or includes additional complexity resulting in an increased annotation time, the image capture device 110 uploads an entirety of the video data without prioritizing individual sections of the video data. For example, the image capture device 110 may upload video sections A-F (illustrated as upload time 1002) to the server(s) 112 and the server(s) 112 may annotate the individual uploaded video sections as they are received (illustrated as annotation time 1004) and generate a video summarization (illustrated by curation time 1006) after annotation is complete for the final video section (e.g., video section F). As video sections A-D are annotated prior to uploading of the final video section F being complete, the annotation time 1004 corresponding to annotating video sections A-D can be ignored. Instead, only the annotation time 1004 associated with video sections E and F delay curation (e.g., generation of the video summarization or the like) and therefore increase perceived latency 1008. As illustrated in FIG. 10, while the image capture device 110 only uploads a single video section at a time (although the present disclosure is not limited thereto), the server(s) 112 may annotate multiple video sections simultaneously. Thus, the server(s) 112 may begin annotating video section F prior to finishing annotating video section E. Therefore, the perceived latency 1008 is increased due to the additional annotation time 1004 associated with final video section F as the server(s) 112 only begins annotating video section F after the upload time 1002 (e.g., uploading of video section F is complete).

To reduce the perceived latency, the video data may be uploaded using the second technique, in full determined order 1010. Using the preview data, the system 100 may determine that video sections E and F require additional annotation time and may prioritize uploading video sections E and F so that the server(s) 112 may annotate video sections E and F while uploading the remaining video sections A-D. As illustrated in FIG. 10, the image capture device 110 may upload video sections A-F beginning with video sections E and F (illustrated as upload time 1012), the server(s) 112 may annotate the video sections as they are received (illustrated as annotation time 1014) and generate a video summarization (illustrated by curation time 1016) after annotation is complete for the final video section (e.g., video section D). While the video data is still uploaded in its entirety (e.g., the upload time 1012 is as long as the upload time 1002), prioritizing video sections E and F means that the perceived latency 1018 is only based on the annotation time 1014 associated with final video section D, which is shorter than the annotation time 1014 associated with video section F.

Additionally or alternatively, to reduce the perceived latency the video data may be uploaded using the third technique, in partial chronological order 1020. Using the preview data, the system 100 may determine that video sections B-D are not required for the video summarization (e.g., video sections B-D do not include interesting moments to include) and therefore the image capture device 110 may only upload video sections A, E and F in chronological order. As illustrated in FIG. 10, the image capture device 110 may upload video sections A, E and F (illustrated as upload time 1022), the server(s) 112 may annotate the video sections as they are received (illustrated as annotation time 1024) and generate a video summarization (illustrated by curation time 1026) after annotation is complete for the final video section (e.g., video section F). By only including portions of the video data (e.g., video sections A, E and F), the upload time 1022 is shorter than the upload time 1002 for the entirety of the video data, decreasing perceived latency 1028 relative to the perceived latency 1008. However, the perceived latency 1028 is increased due to the additional annotation time 1024 associated with final video section F as the server(s) 112 only begins annotating video section F after the upload time 1022 (e.g., uploading of video section F is complete).

To further reduce the perceived latency, the video data may be uploaded using the fourth technique, in partial determined order 1030. Using the preview data, the system 100 may determine that video sections B-D are not required for the video summarization (e.g., video sections B-D do not include interesting moments to include) and therefore the image capture device 110 may only upload video sections A, E and F. Further, the system 100 may determine that video sections E and F require additional annotation time and may prioritize uploading video sections E and F so that the server(s) 112 may annotate video sections E and F while uploading video section A. As illustrated in FIG. 10, the image capture device 110 may upload video sections A, E and F beginning with video sections E and F (illustrated as upload time 1032), the server(s) 112 may annotate the video sections as they are received (illustrated as annotation time 1034) and generate a video summarization (illustrated by curation time 1036) after annotation is complete for the last-annotated video section (e.g., video section F). By only including portions of the video data (e.g., video sections A, E and F), the upload time 1032 is shorter than the upload time 1002 for the entirety of the video data, decreasing perceived latency 1038 relative to the perceived latency 1008. In addition, prioritizing video sections E and F means that the perceived latency 1038 is only increased due to a portion of the annotation time 1014 associated with last-annotated video section F, decreasing perceived latency 1038 relative to the perceived latency 1028.

FIG. 11 illustrates an example of preview data according to embodiments of the present disclosure. Typically, an image capture device 110 captures audio data 1100 and video data 1110 and uploads the audio data 1100 and the video data 1110 (and in some examples additional data, such as annotation data including video tags) to the server(s) 112. As illustrated in FIG. 11, the video data 1110 is relatively large, which is illustrated by the video data 1110 having a greater height than the audio data 1100 (e.g., the x dimension corresponds to a length of time and the y dimension corresponds to a size of the data per second). Therefore, uploading the video data 1110 in its entirety consumes a relatively large amount of bandwidth, memory and/or processing power of the image capture device 110 and/or the server(s) 112.

To generate the preview data 1130, the image capture device 110 may sample the video data 1110 at a fixed sampling frequency to generate sampled video data 1112. For example, the video data 1110 may have a first sampling frequency (e.g., 30 Hz, indicating that there are 30 video frames per second) and the sampled video data may have a second sampling frequency (e.g., 1 Hz, indicating that there is 1 video frame per second). Thus, the sampled video data 1112 may be relatively small (e.g., 30 times smaller than the video data 1110) and uploading the sampled video data 1112 consumes a relatively small amount of bandwidth, memory and/or processing power of the image capture device 110 and/or the server(s) 112 compared to the video data 1110. The preview data 1130 may include the sampled video data 1112, the audio data 1100 and/or annotation data 1120 and the image capture device 110 may upload the preview data 1130 to the server(s) 112.

In some examples, the image capture device 110 may generate the annotation data 1120 using the preview data 1130 prior to uploading the preview data 1130. For example, the image capture device 110 may perform computer vision processing on the sampled video data 1112 to identify transitions, faces/people/objects represented in the sample video data 1112 or the like. Due to hardware limitations of the image capture device 110 relative to the server(s) 112, the annotation data 1120 generated by the image capture device 110 may be limited compared to annotation data generated by the server(s) 112, although the disclosure is not limited thereto. In other examples, the image capture device 110 may generate the annotation data 1120 using the preview data 1130 and may not upload the preview data 1130. In a first example, the image capture device 110 may generate the annotation data 1120 and upload the annotation data 1120 instead of the sampled video data 1112. In a second example, the image capture device 110 may identify transitions in the sampled video data 1112 and may upload portions of the video data 1110 corresponding to the identified transitions.

The annotation data 1120 may indicate significant changes to a scene, such as whether the image capture device 110 has moved (e.g., indoor scene, outdoor scene or the like), whether a number of people in a room has increased/decreased, if a person/object was located near the image capture device 110 for a period of time, if music/speech began, or the like. The annotation data 1120 may include inertial measurement unit (IMU) data indicating if the image capture device 110 is moving, static, handheld, etc. Additionally or alternatively, the annotation data 1120 may include video tags input by a user 10. In a first example, the video tags may be input using buttons on the image capture device 110. In a second example, the video tags may be input using a companion application running on a device 102 operated by the user 10. The video tags may identify moments of interest in the video data 1110 that may be included in the video summarization. While FIG. 11 illustrates the annotation data 1120 corresponding to an entirety of the video data 1110, the disclosure is not limited thereto. Instead, the annotation data 1120 may correspond to portions of the video data 1110 and may include gaps between the portions of the video data 1110. Similarly, while the annotation data 1120 is illustrated as having a constant size over the duration of the video data 1110, the disclosure is not limited thereto and a size of the annotation data 1120 may vary. Additionally or alternatively, the annotation data 1120 may be illustrated as a block of data of variable size that does not correspond to a timeline.

In some examples, the preview data 1130 may include the audio data 1100 as captured by the image capture device 110. Additionally or alternatively, the preview data 1130 may include characteristic data indicating characteristics of the audio data, such as elementary signals of the audio data, an indicating if speech is present, if music is present or the like.

The second sampling frequency may be fixed (e.g., 1 frame per second, although the disclosure is not limited thereto) or may vary based on the video data 1110. For example, the image capture device 110 may perform computer vision processing on the video data 1110 and/or the sampled video data 1112 a first time to identify first portions of the video data 1110 including static images (e.g., redundant video frames, very few moments of activity/motion) and second portions of the video data 1110 including dynamic images (e.g., activity/motion, multiple faces/people or the like). The image capture device 110 may then sample the video data 1110 dynamically, using a relatively lower sampling frequency (e.g., 1 frame per second) for the first portions and a relatively higher sampling frequency (e.g., 5 frames per second) for the second portions. Thus, the sampling rate of the sampled video data 1112 may vary based on a complexity of the video data 1110.

In some examples, the image capture device 110 may generate the sampled video data 1112 while the image capture device 110 captures the video data 1110. For example, the image capture device 110 may stitch panoramic images to generate the video data 1110 and may extract the sampled video data 1112 at a lower sampling rate based on the second sampling frequency. However, the disclosure is not limited thereto and the image capture device 110 may generate the sampled video data 1112 after capturing the video data 1110 without departing from the present disclosure. Additionally or alternatively, the sampled video data 1112 may be a lower resolution than the video data 1110. For example, the video data 1110 may have a first resolution and the sampled video data 1112 may have a second resolution that is lower than the first resolution, resulting in a reduced size of the sample video data per second (e.g., the sampled video data 1112 has a reduced height in the y direction relative to the video data 1110).

FIGS. 12A-12C illustrate examples of selecting portions of video data in time and/or space according to embodiments of the present disclosure. As illustrated in FIG. 12A, the system 100 may select portions of the video data 1210 in time. For example, the uploaded video data 1220 may include an entire field of view of the video data 1210 (e.g., panoramic field of view or the like) for a portion of the overall time period, indicated by video clips A-E corresponding to unique periods of time within the video data

1210. While the uploaded video data 1220 is illustrated as being the same size as the video data 1210 (e.g., similar heights in a vertical dimension corresponding to size per second), the present disclosure is not limited thereto. For example, while the uploaded video data 1220 may include the entire field of view of the video data 1210, the uploaded video data 1220 may have a lower resolution than the video data 1210 to reduce a size of the uploaded video data 1220.

As illustrated in FIGS. 12B-12C, the system 100 may select portions of the video data 1210 in space. Thus, the video data 1210 may include a first field of view and the uploaded video data 1222/1224 may include a second field of view smaller than the first field of view. For example, a first resolution of the video data 1210 may include the full first field of view and include 5200 pixels in a horizontal direction (e.g., along the x axis) and 1080 pixels in a vertical direction (e.g., along the y axis), while a second resolution of the uploaded video data 1222/1224 may include a cropped second field of view and include 3200 pixels in the horizontal direction and 720 pixels in the vertical direction. The second field of view (e.g., second resolution) is not limited to a specific resolution and/or aspect ratio, however, and may be determined based on objects represented in the video data 1210. For example, objects may be present in only a portion of the video data 1210 while the remainder of the video data 1210 is static, such as when the image capture device 110 is placed near a wall or other obstruction. Therefore, only the portion of the video data including the objects may be selected by the system 100 to be included in the uploaded video data 1222/1224. However, the uploaded video data may be selected using a specific resolution and/or fixed aspect ratio without departing from the present disclosure. In addition to the uploaded video data 1222/1224 including the second field of view smaller than the first field of view, the uploaded video data 1222/1224 may decrease a resolution of the uploaded video data 1222/1224 relative to the video data 1210. For example, the video data 1210 may have a first pixel density (e.g., lines per inch) and the uploaded video data 1222/1224 may have a second pixel density smaller than the first pixel density.

FIG. 12B illustrates the uploaded video data 1222 selecting portions of the video data 1210 using a fixed framing window. For example, the image capture device 110 may be positioned near a wall or other obstruction and the video data 1210 may include static portions with no activity/movement or the like for the entirety of the video data 1210. Using the fixed framing window, the image capture device 110 may crop the video data 1210 to the uploaded video data 1222 uniformly to remove the static portions of the video data 1210.

In contrast to the fixed framing window illustrated in FIG. 12B, FIG. 12C illustrates the uploaded video data 1224 selecting portions of the video data 1210 using a dynamic framing window. Thus, the video data 1210 may correspond to a first field of view including dynamic objects/motion or the like but the uploaded video data 1224 may be selected to include only a portion of the first field of view. For example, the image capture device 110 may perform computer vision processing to identify objects of interest, motion or the like and may vary the dynamic framing window. Thus, the uploaded video data 1224 may include a second field of view based on the objects represented in the video data 1210. As discussed above, the second field of view is not limited to a specific resolution and/or aspect ratio and may include additional portions of the video data 1210 to allow the server(s) 112 room to crop/pan/zoom within the uploaded video data 1224 when selecting a fixed aspect ratio.

While FIG. 12A illustrates the system 100 selecting portions of the video data 1210 in time and FIG. 12B-12C illustrates the system 100 selecting portions of the video data 1210 in space, the system 100 may select portions of the video data 1210 in time and space. For example, the uploaded video data may include portions of the video data 1210 in time (e.g., video clips corresponding to a period of time) and space (e.g., a portion of the panoramic field of view). In some examples, the system 100 may determine the portion of the panoramic field of view to include for individual video clips. For example, a first video clip (e.g., beginning at a 1 minute mark of the video data 1210) may include the entire panoramic field of view, a second video clip (e.g., beginning at a 5 minute mark in the video data 1210) may include a fixed field of view within the panoramic field of view and a third video clip (e.g., beginning at a 10 minute mark in the video data 1210) may include a dynamic field of view within the panoramic field of view.

Figure 13A:
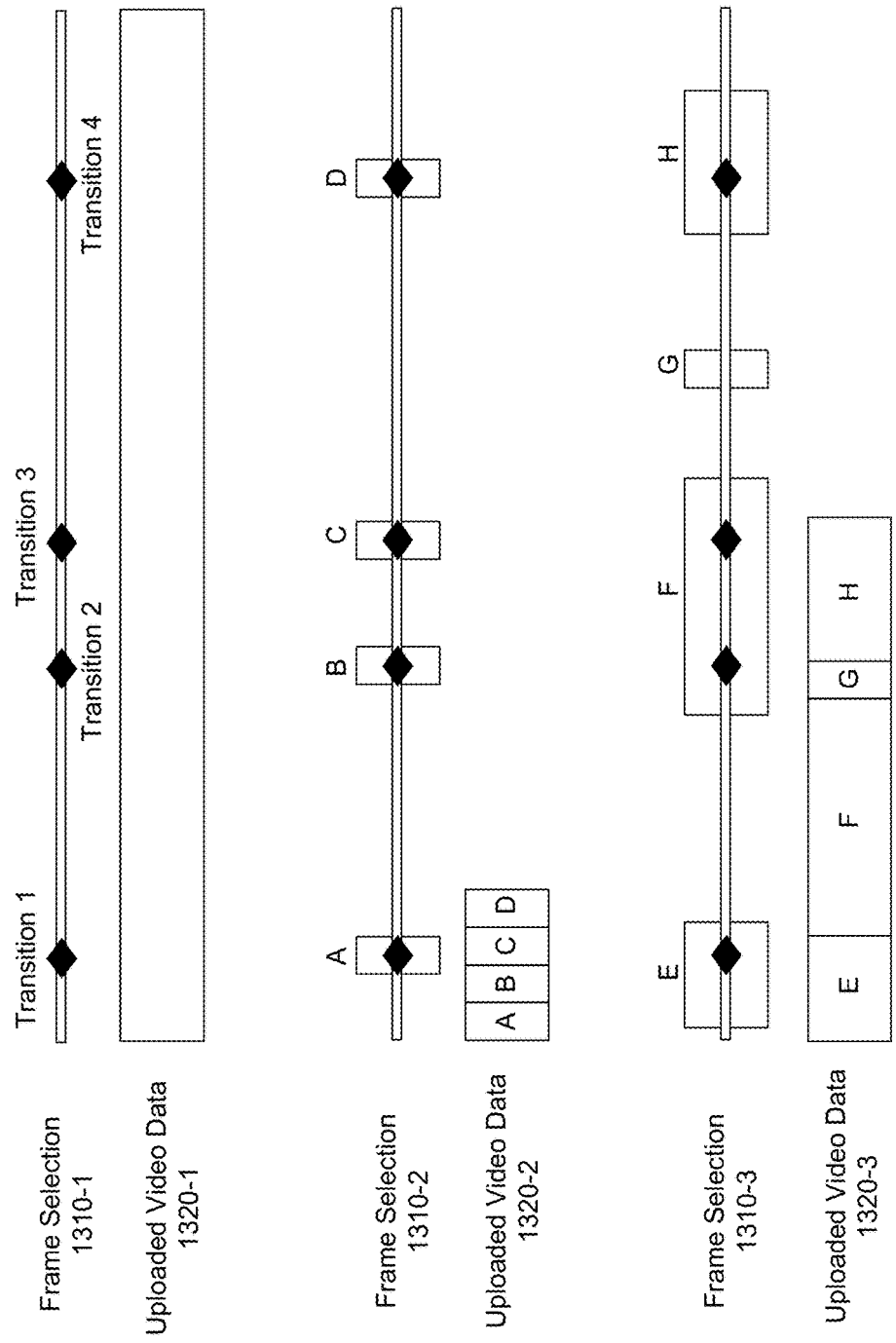
FIGS. 13A-13B illustrate examples of identifying transitions and determining portions of video data to upload according to embodiments of the present disclosure.
Figure 13B:
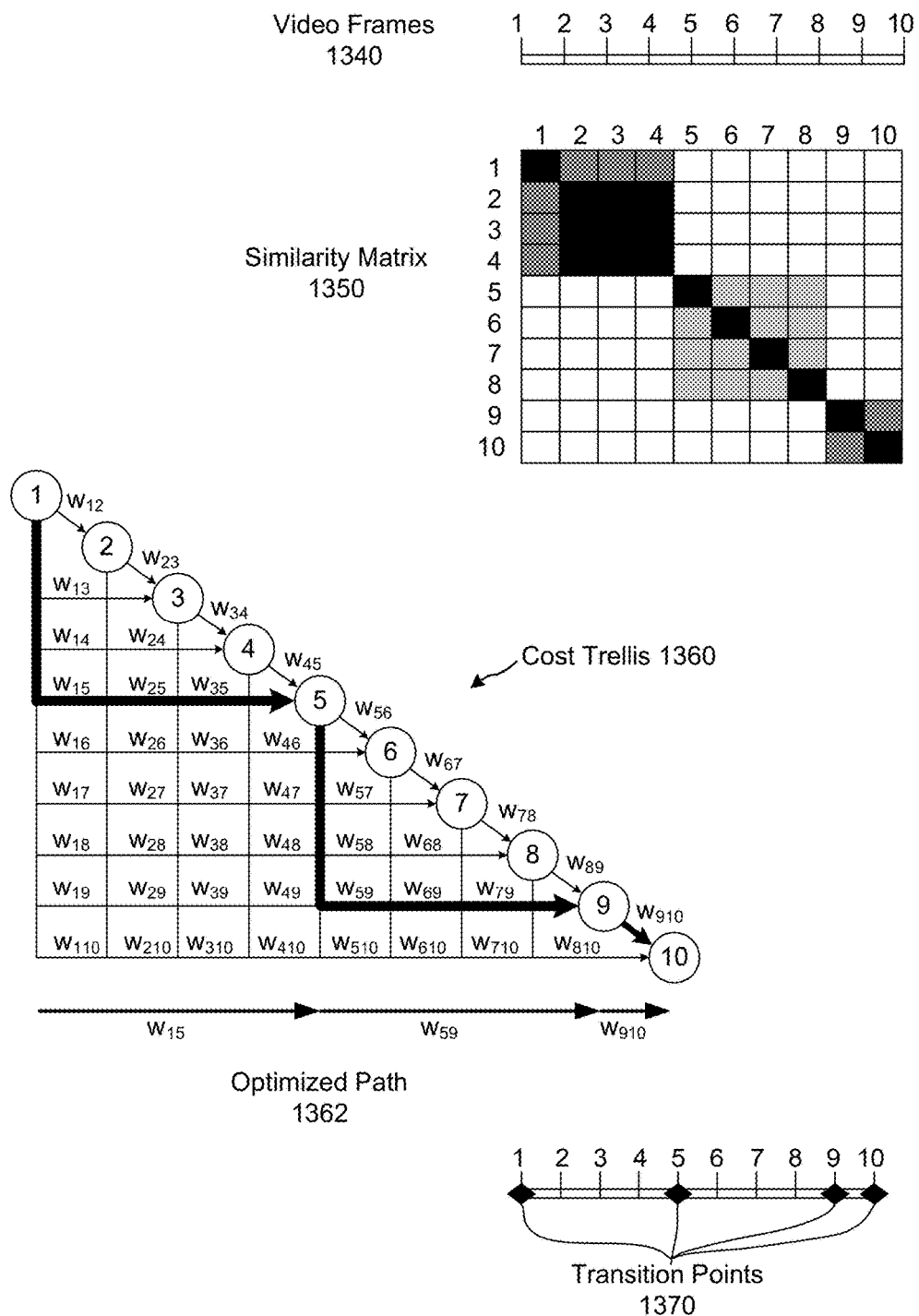

To select portions of the video data to include in time, the system 100 may identify transitions in the video data. FIGS. 13A-13B illustrate examples of identifying transitions and determining portions of video data to upload according to embodiments of the present disclosure. As illustrated in FIG. 13A, the system 100 may determine first frame selection 1310-1 indicating transitions (e.g., Transitions 1-4) in the video data. In some examples, the system 100 may identify transitions within the video clip by grouping video frames based on a similarity index. For example, first video frames preceding Transition 1 may be substantially similar while second video frames between Transition 1 and Transition 2 may be substantially similar, although the first video frames may be substantially different than the second video frames (e.g., the similarity score is below a threshold). The transitions may correspond to large changes in the video data, such as scene changes, movement, change in a number of faces detected or the like. In some examples, the system 100 may identify the transitions using low-level image features such as color histograms, spatial correlation, normalized cross-correlation (NCC), motion vectors or the like, although the present disclosure is not limited thereto.

FIG. 13A illustrates three techniques for selecting portions of the video data to upload after determining the transitions, although the disclosure is not limited thereto. As illustrated in FIG. 13A, the system 100 may select the portions of the video data to upload using a first technique, which includes determining the transitions (e.g., the frame selection 1310-1) and uploading an entirety of the video data (e.g., uploaded video data 1320-1) along with the transitions. Additionally or alternatively, the system 100 may select the portions of the video data to upload using a second technique, which includes determining the transitions and selecting a period of time surrounding the transitions. For example, the system 100 may determine frame selection 1310-2 which includes a fixed period of time centered on each of the transitions (e.g., video clips A-D), and the uploaded video data 1320-2 may include the selected portions of the video data (e.g., video clips A-D). As another example, the system 100 may select the portions of the video data to upload using a third technique, which includes determining the transitions, generating annotation data (e.g., performing computer vision processing) and selecting video clips based on the annotation data. For example, video clip E includes Transition 1, video clip F includes Transitions 2-3, video clip G includes a portion of the video data that isn't associated with a transition and video clip H includes Transition 4. Therefore, the uploaded video data 1320-3 may include the selected portions of the video data (e.g., video clips E-H) that have varying periods of time. While not illustrated in FIG. 13A, the uploaded video data 1320-3 may include a portion of the video data in space, as discussed above with regard to FIGS. 12B-12C.

As discussed above, a complexity metric may be determined based on limited computer vision processing for example using color histograms, similarity metrics or the like. The system 100 may determine the complexity metric in order to select portions of the video data that require the extensive computer vision processing used to generate priority metrics.

FIG. 13B illustrates an example of identifying transition points according to embodiments of the present disclosure. As illustrated in FIG. 13B, the system 100 may identify transition points within the video data by grouping video frames based on a similarity score. For example, first video frames may be substantially similar while second video frames may be substantially similar, although the first video frames may be substantially different than the second video frames (e.g., a difference in similarity scores is above a threshold). The transition points may correspond to large changes in the video data, such as scene changes, movement, change in a number of faces detected or the like. In some examples, the system 100 may identify the transition points using low-level image features such as color histograms, spatial correlation or the like, although the present disclosure is not limited thereto.

The system 100 may use the transition points to identify scenes or other changes in the video data that may be used to determine a beginning or an end of a video section. For example, a series of video frames (e.g., video frames 1-100) may have a complexity metric above a threshold and the system 100 may therefore select the series of video frames. However, a first portion of the video frames (e.g., video frames 1-40) may be substantially similar (e.g., difference in similarity scores is above a threshold) but substantially different than a second portion of the video frames (e.g., video frames 41-100). The system 100 may determine a transition point between the first portion and the second portion (e.g., transition point at video frame 40) and may select the first portion as a first video section and the second portion as a second video section.

As illustrated in FIG. 13B, the system 100 may determine a similarity score between individual video frames of a portion of video data. For ease of explanation, FIG. 13B illustrates video frames 1340 including discrete video frames (e.g., video frames 1-10), and the system 100 may determine a similarity score between each of the individual video frames. For example, the system 100 may determine a first similarity score between video frame 1 and video frame 2, a second similarity score between video frame 1 and video frame 3, a third similarity score between video frame 1 and video frame 4 and so on until the system 100 has determined a similarity score between every pair of video frames 1340. The similarity scores may be determined using image features (e.g., color histograms) extracted from the video frames 1340, spatial correlation, normalized cross-correlation (NCC) and/or motion vectors across the video frames 1340. The similarity scores may be a numerical value between 0 and 1, with a similarity score of 0 indicating completely different video frames and a similarity score of 1 indicating identical video frames.

While the similarity scores are numerical values, FIG. 13B illustrates a similarity matrix 1350 conceptually illustrating relative bands of similarity scores, with a darker color representing a higher similarity score. For example, an extremely high similarity score (e.g., 0.9 to 1.0) may be represented by a black square, a high similarity score (e.g., 0.75 to 0.9) may be represented by a dark grey square, a medium similarity score (e.g., 0.25 to 0.75) may be represented by a light grey square and a low similarity score (e.g., 0 to 0.25) may be represented by a white square. As illustrated in the similarity matrix 1350, a black diagonal line runs from top left to bottom right, indicating that the video frames are identical to themselves (e.g., video frame 1 is identical to video frame 1, video frame 2 is identical to video frame 2, etc.).

Based on the similarity scores, the system 100 may separate the video frames 1340 into several groups of video frames having similarity scores above a threshold. For example, video frames 2-4 are identical to each other and have a strong similarity to video frame 1, video frames 5-8 have a medium similarity, and video frame 9 has a strong similarity to video frame 10. Therefore, the system 100 may group the video frames 1340 in various configurations based on a number of transition points for the video data. For example, in a first configuration the system 100 may group the video frames 1340 as video frame 1, video frames 2-4, video frames 5-8 and video frames 9-10, corresponding to five transition points. In a second configuration, the system 100 may group the video frames 1340 as video frames 1-4, video frames 5-8 and video frames 9-10, corresponding to four transition points. To determine the optimal number of transition points, the system 100 may generate a cost trellis 1360.

To generate the cost trellis 1360, the system 100 may determine a cost of introducing a transition point across the video frames 1340. For example, the system 100 may determine a cost w12 between video frame 1 and video frame 2, a cost w13 between video frame 1 and video frame 3, a cost w14 between video frame 1 and video frame 4 and so on until a cost w910 between video frame 9 and video frame 10. The system 100 may determine the costs based on individual similarity scores in the similarity matrix 1350. To determine the transition points, the system 100 may determine an optimal path between video frame 1 and video frame 10 in the cost trellis 1360. For example, the system 100 may determine that a cost w15 between video frame 1 and video frame 5 is lower than a cost w16 between video frame 1 and video frame 6 as video frame 6 is not similar to video frames 1-4 (e.g., similarity score is below a threshold) but is similar to video frame 5 (e.g., similarity score is above the threshold).

To determine the optimal path, the system 100 may use an optimization algorithm to minimize an overall cost associated with the video frames 1340. In some examples, the overall cost may be determined by summing individual costs from video frame 1 to video frame 10. As illustrated in FIG. 13B, for example, the optimized path 1362 may include cost w15 between video frame 1 and video frame 5, cost w59 between video frame 5 and video frame 9 and cost w910 between video frame 9 and video frame 10. Based on the optimized path 1362, the system 100 may determine transition points 1370, which include a first transition point at video frame 1 (beginning of the video data), a second transition point at video frame 5 (separating video frame 4 and video frame 5), a third transition point at video frame 9 (separating video frame 8 and video frame 9) and a fourth transition point at video frame 10 (end of the video data). Thus, the system 100 may group video frames 1-4, video frames 5-8 and video frames 9-10.

The system 100 may determine a total number of transition points based on a length of the video data, a size of the similarity matrix 1350, a computational budget available on the system 100 or the like. If there were additional transition points available, the system 100 may determine an additional transition point at video frame 2 (separating video frame 1 and video frame 2) and/or video frame 9 (separating video frame 9 from video frame 10). However, the similarity score between video frames 1-2 and 9-10 are relatively high and the system 100 may simplify the optimized path 1362 by removing the additional transition points.

FIGS. 14A-14B illustrate examples of determining an order to upload individual video sections according to embodiments of the present disclosure. As discussed above with regard to FIG. 10, the system 100 may upload video data in full determined order 1010 (e.g., uploading the entirety of the video data in an order determined by the system 100). As illustrated in FIG. 14A, the system 100 may determine the full determined order by dividing video data 1410 into uniform sections of video data. For example, the system 100 may divide the video data 1410 into video sections 1420 (e.g., video sections A-F) having a uniform period of time. To determine the order to upload the video sections 1420, the system 100 may generate a complexity metric graph 12 corresponding to the video data 1410 and may prioritize the video sections 1420 associated with peaks in the complexity metric graph 1412. For example, a highest peak may correspond to video section C, a second highest peak may correspond to video section B, a third highest peak may correspond to video section A, and so on. Therefore, the system 100 may determine an order of the uploaded video data 1422 based on the peaks (e.g., video section C, followed by video section B, followed by video section A, etc.). Additionally or alternatively, the system 100 may determine the order of the uploaded video data 1422 based on an integral of the complexity metrics associated with the peak (e.g., area below the peak). Using this technique, the server(s) 112 may have additional time to annotate the video sections 1420 associated with the highest peaks in the complexity metric graph 1412.

As illustrated in FIG. 14B, the system 100 may determine the full determined order by dividing the video data 1410 into variable sections of video data. In some examples, the system 100 may generate the complexity metric graph 1412 corresponding to the video data 1410 and may determine video sections 1430 (e.g., video sections A-F) based on peaks in the complexity metric graph 1412. Thus, the individual video sections 1430 may have variable lengths of time based on a length of the corresponding peak in the complexity metric graph 1412. Additionally or alternatively, the system 100 may determine video sections 1430 (e.g., video sections A-F) using the transition points determined using the techniques described above with regard to FIG. 13B.

As discussed above with regard to FIG. 14A, the system 100 may determine the order to upload the video sections 1430 based on a height and/or integral of a corresponding peak. Therefore, the system 100 may determine an order of the uploaded video data 1432 based on the peaks (e.g., video section C, followed by video section B, followed by video section A, etc.). Using this technique, the server(s) 112 may have additional time to annotate the video sections 1430 associated with the highest peaks in the complexity metric graph 1412.

FIGS. 15A-15B illustrates examples of determining an order to upload individual video sections including a portion of video data according to embodiments of the present disclosure. As discussed above with regard to FIG. 10, the system 100 may upload video data in partial determined order 1030 (e.g., uploading a portion of the video data in an order determined by the system 100). As illustrated in FIG. 15A, the system 100 may determine the partial determined order by dividing video data 1510 into uniform sections of video data. For example, the system 100 may divide the video data 1510 into video sections 1520 (e.g., video sections A-F) having a uniform period of time. To determine the order to upload the video sections 1520, the system 100 may generate a complexity metric graph 12 corresponding to the video data 1510 and may prioritize the video sections 1520 associated with peaks in the complexity metric graph 1512. For example, a highest peak may correspond to video section C, a second highest peak may correspond to video section B, a third highest peak may correspond to video section A, and so on. Therefore, the system 100 may determine an order of the uploaded video data 1522 based on the peaks (e.g., video section C, followed by video section B, followed by video section A, etc.). Additionally or alternatively, the system 100 may determine the order of the uploaded video data 1522 based on an integral of the complexity metrics associated with the peak (e.g., area below the peak).

In addition to determining the order based on the peaks, the system 100 may select video sections 1520 to upload based on a height and/or integral of a corresponding peak. For example, the system 100 may determine that the video sections D and E are below a threshold and therefore the uploaded video data 1522 only includes video sections A-C and F. Using this technique, the server(s) 112 may have additional time to annotate the video sections 1520 associated with the highest peaks in the complexity metric graph 1512 and may reduce a perceived latency by an upload time associated with uploading video sections D and E.

As illustrated in FIG. 15B, the system 100 may determine the partial determined order by dividing the video data 1510 into variable sections of video data. In some examples, the system 100 may generate the complexity metric graph 12 corresponding to the video data 1510 and may determine video sections 1530 (e.g., video sections A-D) based on peaks in the complexity metric graph 1512. Thus, the individual video sections 1530 may have variable lengths of time based on a length of the corresponding peak in the complexity metric graph 1512. Additionally or alternatively, the system 100 may determine video sections 1530 (e.g., video sections A-D) using the transition points determined using the techniques described above with regard to FIG. 13B.

As discussed above with regard to FIG. 15A, the system 100 may determine the order to upload the video sections 1530 based on a height and/or integral of a corresponding peak. Therefore, the system 100 may determine an order of the uploaded video data 1532 based on the peaks (e.g., video section C, followed by video section B, followed by video section A, etc.). In addition to determining the order based on the peaks, the system 100 may determine the video sections 1530 based on a height and/or integral of a corresponding peak and may ignore portions of the video data 1510 associated with low complexity metrics. For example, the portion of the video data 1510 between video section C and video section D is associated with complexity metrics below a threshold and therefore omitted from the uploaded video data 1532. Using this technique, the server(s) 112 may have additional time to annotate the video sections 1530 associated with the highest peaks in the complexity metric graph 1512 and may reduce a perceived latency by an upload time associated with uploading the portion of the video data 1510 between video section C and video section D.

While FIGS. 14A-15B illustrate the system 100 generating a complexity metric graph 1412/1512, the disclosure is not limited thereto. Instead, the system 100 may generate a similarity metric graph without departing from the disclosure. The similarity metric graph may correspond to similarity metrics associated with adjacent video frames, the similarity metric indicating a similarity between the two video frames. Thus, the system 100 may select the portions of the video data based on similarity metrics instead of and/or in addition to complexity metrics.

Figure 16:
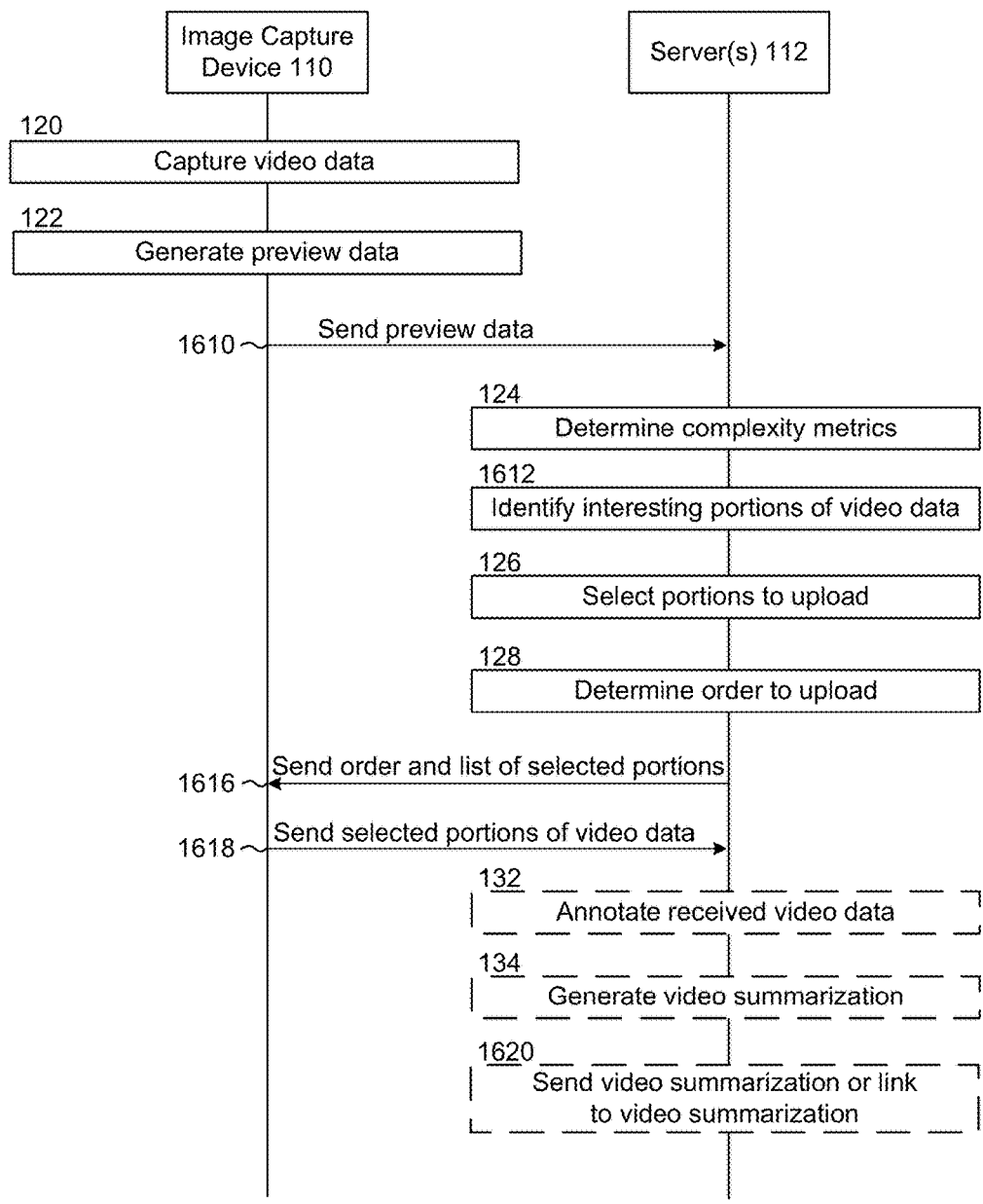
FIG. 16 is a communication diagram conceptually illustrating an example method for determining a portion of video data to upload and an order to upload the portion of video data according to embodiments of the present disclosure.

FIG. 16 is a communication diagram conceptually illustrating an example method for determining a portion of video data to upload and an order to upload the portion of video data according to embodiments of the present disclosure. As illustrated in FIG. 16, an image capture device 110 may capture (120) video data, generate (122) preview data and send (1610) the preview data to server(s) 112. The preview data may include audio data, annotation data and sampled video data, as discussed in greater detail above with regard to FIG. 11.

The server(s) 112 may receive the preview data, determine (124) complexity metrics associated with the sampled video data, identify (1612) complex portions of the video data using the complexity metrics, select (126) portions of the video data to upload (e.g., corresponding to the complex portions of the video data) and determine (128) an order with which to upload the portions of the video data, as discussed in greater detail above with regard to FIGS. 13-15B. While steps 1612, 126 and 128 indicate uploading only portions of the video data, in some examples the portions of the video data selected to upload may include an entirety of the video data, as described above with regard to the full determined order 1010. In other examples, the portions of the video data selected to upload may include only portions of the video data, as described above with regard to partial chronological order 1020 and/or partial determined order 1030.

The server(s) 112 may send (1616) the determined order and a list of the selected portions of the video data to the image capture device 110 and the image capture device 110 may send (1618) the selected portions of video data in the determined order to the server(s) 112. The server(s) 112 may then optionally annotate (132) the received video data, generate (134) a video summarization and/or send (1620) the video summarization or a link to the video summarization to the user 10 (e.g., via the device 102, the image capture device 110 and/or a remote device).

Using the communication diagram illustrated in FIG. 16, the system 100 may decrease a perceived latency from a first time when the user 10 instructs the image capture device 110 to begin uploading the video data to a second time when the user 10 receives the video summarization. For example, as discussed in greater detail above with regard to FIG. 10, an upload time associated with uploading the video data may be decreased by omitting portions of the video data that are not included in the video summarization and/or an annotation delay associated with annotating the video data after the video data is uploaded may be decreased by prioritizing portions of the video data that require extensive annotation.

Figure 17:
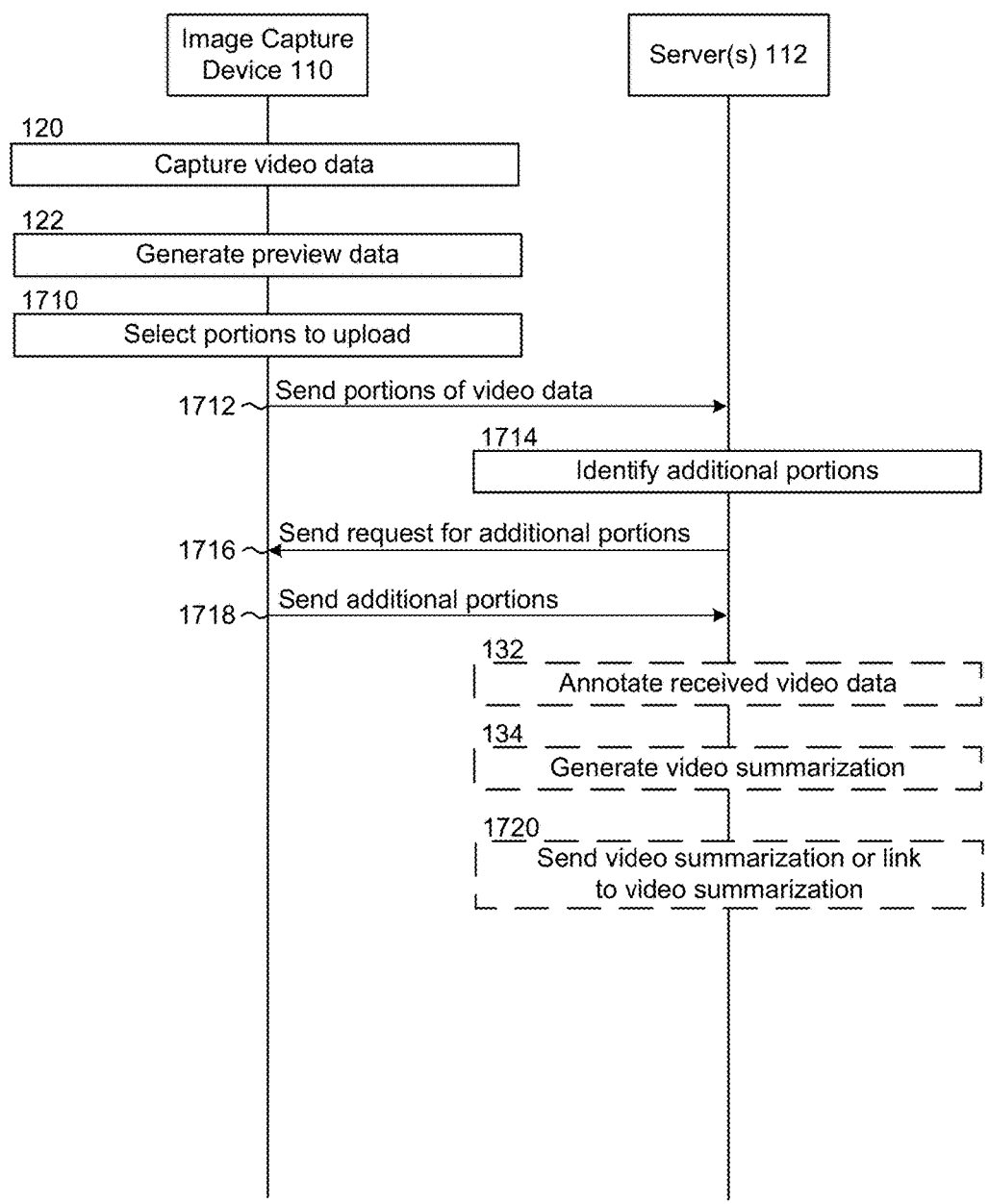
FIG. 17 is a communication diagram conceptually illustrating an example method for uploading a portion of video data and requesting additional video data according to embodiments of the present disclosure.

FIG. 17 is a communication diagram conceptually illustrating an example method for uploading a portion of video data and requesting additional video data according to embodiments of the present disclosure. As illustrated in FIG. 17, an image capture device 110 may capture (120) video data, generate (122) preview data and select (1710) portions of the video data to upload. For example, the image capture device 110 may identify transitions as discussed above with regard to FIG. 13 and may select portions of the video data surrounding the transitions. In some examples, the image capture device 110 may upload fixed periods of time corresponding to individual transitions. In other examples, the image capture device 110 may perform computer vision processing to generate annotation data to select the portions of the video data to upload. The image capture device 110 may send (1712) the selected portions of the video data to server(s) 112. In some examples, the image capture device 110 may send the preview data in addition to the selected portions of the video data.

The server(s) 112 may identify (1714) a need for additional portions of the video data and may send (1716) a request for the additional portions to the image capture device 110 and the image capture device 110 may send (1718) the additional portions to the server(s) 112. In some examples, the server(s) 112 may analyze the selected portions of the video data and/or the preview data and may request larger portions of the video data temporally proximate to the selected portions and/or specific timestamps in the preview data. For example, the selected portions of the video data may omit a portion of an interesting moment that the server(s) 112 determine should be included in a video summarization. The server(s) 112 may request the additional portions of the video data including the omitted portion of the interesting moment. Additionally or alternatively, the selected portions of the video data may include fixed periods of time throughout the video data and the server(s) 112 may analyze the portions of the video data to identify interesting regions of the video data and may request the interesting regions of the video data.

The server(s) 112 may then optionally annotate (132) the received video data, generate (134) a video summarization and/or send (1720) the video summarization or a link to the video summarization to the user 10 (e.g., via the device 102, the image capture device 110 and/or a remote device).

Using the communication diagram illustrated in FIG. 17, the system 100 may decrease a perceived latency from a first time when the user 10 instructs the image capture device 110 to begin uploading the video data to a second time when the user 10 receives the video summarization. For example, as discussed in greater detail above with regard to FIGS. 10 and 15A-15B, an upload time associated with uploading the video data may be decreased by omitting portions of the video data that are not included in the video summarization.

Figure 18:
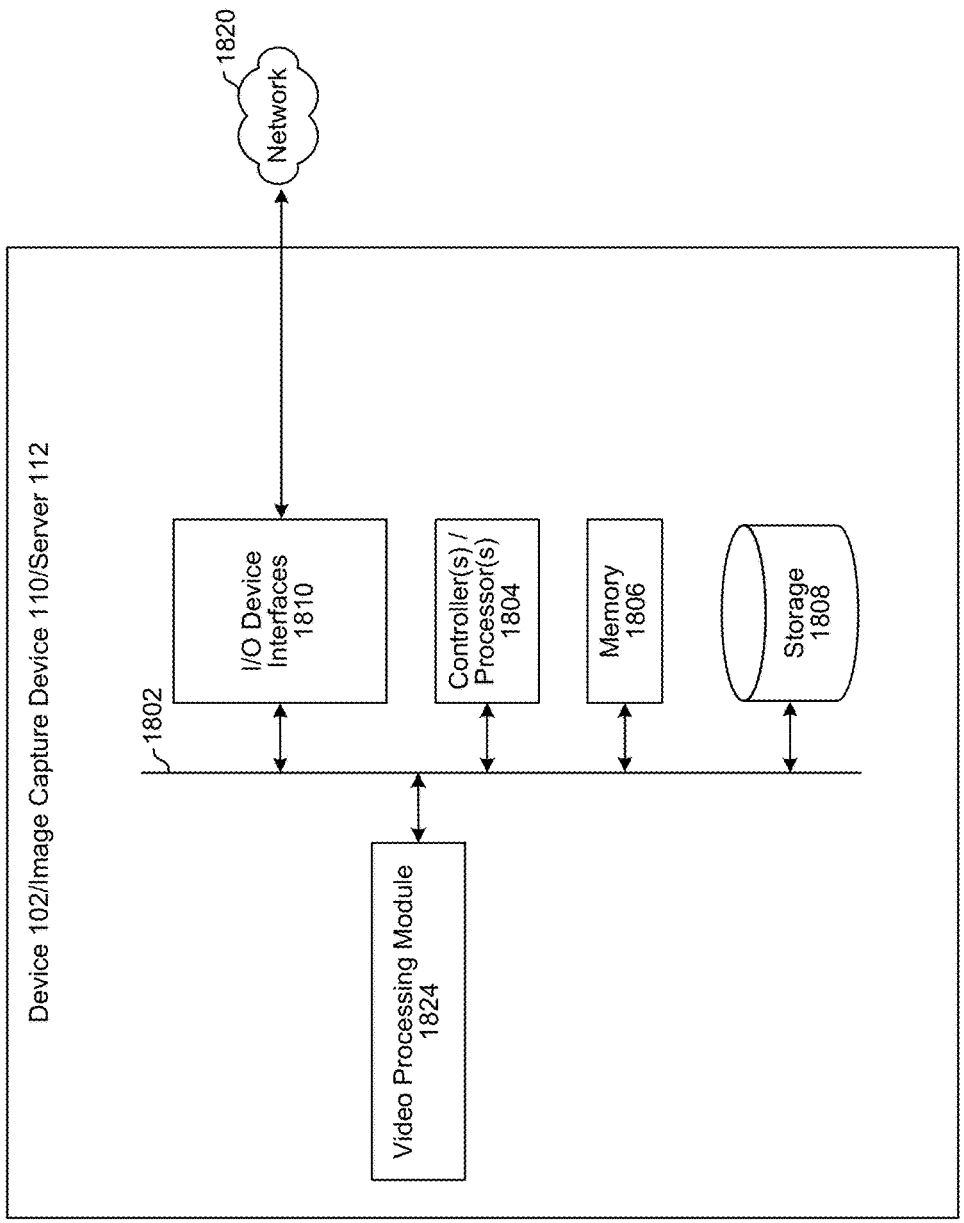
FIG. 18 is a block diagram conceptually illustrating example components of a system according to embodiments of the present disclosure.

FIG. 18 illustrates a block diagram conceptually illustrating example components of a system 100 including one or more of a device 102, an image capture device 110 and/or a server(s) 112. Depending upon how the system is structured, some of the components illustrated in FIG. 18 as part of the device 102, the image capture device 110 or the server(s) 112 may be included only in the device 102, the image capture device 110 or in the server(s) 112, or may be distributed across multiple devices 102, image capture devices 110 and/or servers 112. Other components not illustrated may also be included in the device 102, the image capture device 110 and/or the server(s) 112. In operation, the system 100 may include computer-readable and computer-executable instructions that reside in storage 1808 on the device 102/image capture device 110/server(s) 112. The device 102/image capture device 110/server(s) 112 may be an electronic device capable of performing video processing. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/image capture device 110/server(s) 112 may also be a component of any of the abovementioned devices or systems.

As illustrated in FIG. 18, the device 102/image capture device 110/server(s) 112 may include an address/data bus 1802 for conveying data among components of the device 102/image capture device 110/server(s) 112. Each component within the device 102/image capture device 110/server(s) 112 may also be directly connected to other components in addition to (or instead of) being connected to other components across the bus 1802.

The device 102/image capture device 110/server(s) 112 may include one or more controllers/processors 1804 comprising one-or-more central processing units (CPUs) for processing data and computer-readable instructions and a memory 1806 for storing data and instructions. The memory 1806 may include volatile random access memory (RAM), non-volatile read only memory (ROM), non-volatile magnetoresistive (MRAM) and/or other types of memory. The device 102/image capture device 110/server(s) 112 may also include a data storage component 1808 for storing data and processor-executable instructions. The data storage component 1808 may include one or more non-volatile storage types such as magnetic storage, optical storage, solid-state storage, etc. The device 102/image capture device 110/server(s) 112 may also be connected to a removable or external non-volatile memory and/or storage (such as a removable memory card, memory key drive, networked storage, etc.) through the input/output device interfaces 1810.

The device 102/image capture device 110/server(s) 112 includes input/output device interfaces 1810. A variety of components may be connected to the device 102/image capture device 110/server(s) 112 through the input/output device interfaces 1810, such as camera(s) 115 and microphone(s) 116. However, the disclosure is not limited thereto and the device 102/image capture device 110/server(s) 112 may not include an integrated camera or microphone. Thus, the camera(s) 115, microphone(s) 116 and/or other components may be integrated into the device 102/image capture device 110/server(s) 112 or may be separate without departing from the disclosure. In some examples, the image capture device 110 may include an inertial measurement unit (IMU), gyroscope, accelerometers or other component configured to provide motion data or the like associated with the image capture device 110.

The input/output device interfaces 1810 may be configured to operate with a network 1820, for example a wireless local area network (WLAN) (such as WiFi), Bluetooth, ZigBee and/or wireless networks, such as a Long Term Evolution (LTE) network, WiMAX network, 3G network, etc. The network 1820 may include a local or private network or may include a wide network such as the internet. Devices may be connected to the network 1820 through either wired or wireless connections.

The input/output device interfaces 1810 may also include an interface for an external peripheral device connection such as universal serial bus (USB), FireWire, Thunderbolt, Ethernet port or other connection protocol that may connect to networks 1820. The input/output device interfaces 1810 may also include a connection to an antenna (not shown) to connect one or more networks 1820 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/image capture device 110/server(s) 112 further includes a video processing module 1824, which may comprise processor-executable instructions stored in storage 1808 to be executed by controller(s)/processor(s) 1804 (e.g., software, firmware), hardware, or some combination thereof. For example, components of the video processing module 1824 may be part of a software application running in the foreground and/or background on the device 102/image capture device 110/server(s) 112. The video processing module 1824 may control the device 102/image capture device 110/server(s) 112 as discussed above, for example with regard to FIGS. 1, 16 and/or 17. Some or all of the controllers/modules of the video processing module 1824 may be executable instructions that may be embedded in hardware or firmware in addition to, or instead of, software. In one embodiment, the device 102/image capture device 110/server(s) 112 may operate using an Android operating system (such as Android 4.3 Jelly Bean, Android 4.4 KitKat or the like), an Amazon operating system (such as FireOS or the like), or any other suitable operating system.

Executable computer instructions for operating the device 102/image capture device 110/server(s) 112 and its various components may be executed by the controller(s)/processor(s) 1804, using the memory 1806 as temporary "working" storage at runtime. The executable instructions may be stored in a non-transitory manner in non-volatile memory 1806, storage 1808, or an external device. Alternatively, some or all of the executable instructions may be embedded in hardware or firmware in addition to or instead of software.

The components of the device(s) 102/image capture device 110/server(s) 112, as illustrated in FIG. 18, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 19:
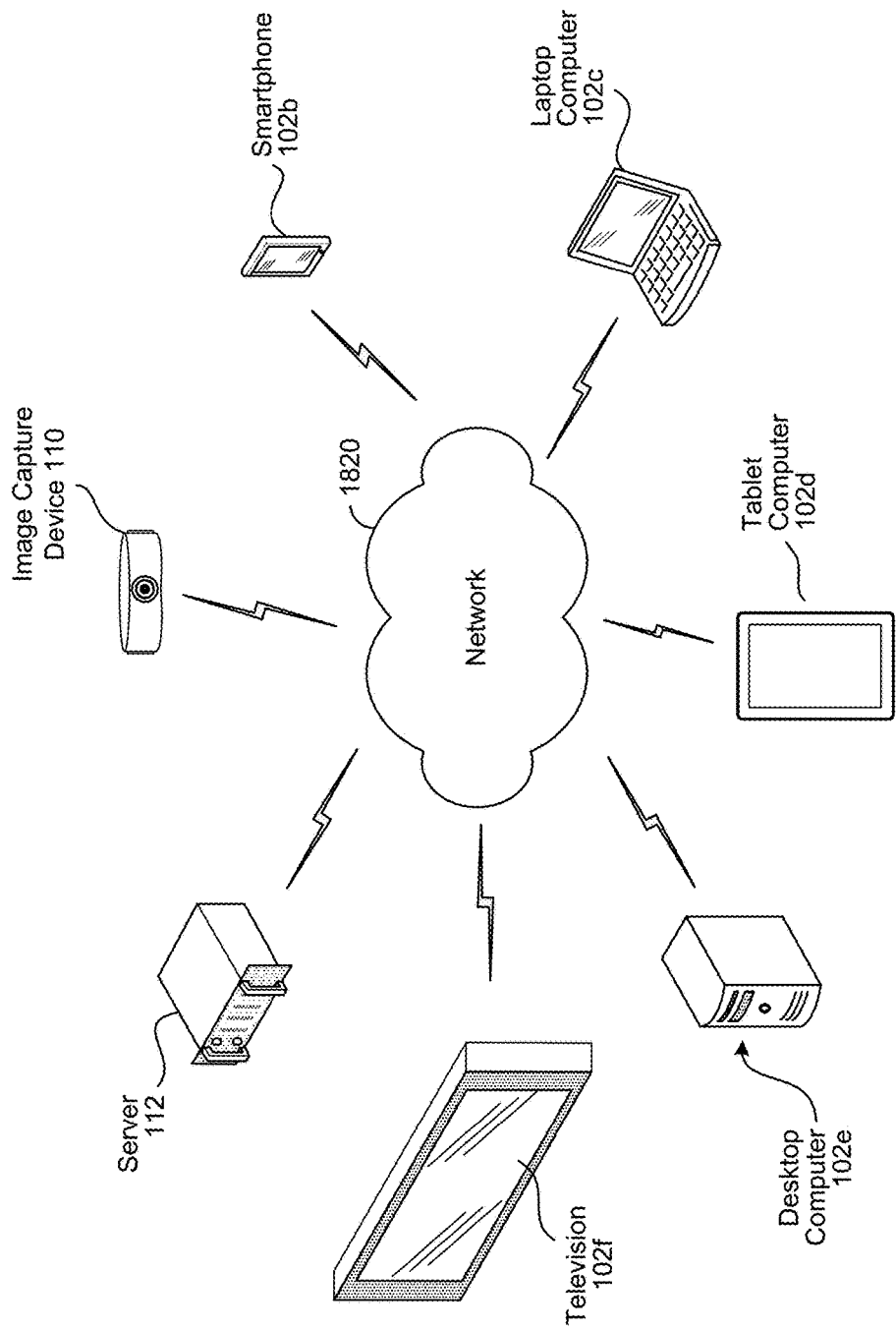
FIG. 19 illustrates an example of a computer network for use with the system.

As shown in FIG. 19, multiple devices may be connected over a network 1820. The network 1820 may include a local or private network or may include a wide network such as the internet. Devices may be connected to the network 1820 through either wired or wireless connections. For example, a smart phone 102b may be connected to the network 1820 through a wireless service provider. Other devices, such as an image capture device 110, laptop computer 102c, tablet computer 102d, desktop computer 102e, television 102f, and/or server(s) 112, may connect to the network 1820 through a wired connection. The server(s) 112 may be configured to receive, store, process and/or stream data related to image data and/or audio data associated with one or more of the image capture device 110, smartphone 102b, laptop computer 102c, tablet computer 102d, desktop computer 102e and television 102f, etc. For example, the server(s) 112 may perform any of the steps described above with regard to FIGS. 1, 16 and/or 17. Alternatively, the server(s) 112 may receive and store data generated by the v image capture device 110, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server(s) 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for uploading video data, the method comprising:
   receiving, from an image capture device, sampled video data associated with first video data, the sampled video data having a first frame rate that is different than a second frame rate of the first video data and comprising a first portion associated with a first time and a second portion associated with a second time captured after the first time;
   determining a plurality of color histograms, including determining a first color histogram that corresponds to a first video frame in the sampled video data;
   determining a plurality of similarity scores, including:
      determining a first similarity score, which corresponds to a first similarity between a first video frame and a second video frame in the sampled video data, by comparing the first color histogram to a second color histogram corresponding to the second video frame; and
      determining a second similarity score, which corresponds to a second similarity between the first video frame and a third video frame in the sampled video data, by comparing the first color histogram to a third color histogram corresponding to the third video frame;
   determining that a first group of similarity scores of the plurality of similarity scores are within a first range;
   determining a first series of contiguous video frames corresponding to the first group of similarity scores;
   determining that a second group of similarity scores of the plurality of similarity scores are within a second range;
   determining a second series of contiguous video frames corresponding to the second group of similarity scores, the second series beginning with a fourth video frame in the sampled video data;
   determining a plurality of transition points in the sampled video data, including determining a first transition point that corresponds to an intersection between the first series and the second series by determining that a third similarity score, which corresponds to a third similarity between the first video frame and the fourth video frame, is below a threshold;
   determining a first number of the plurality of transition points corresponding to the first portion;
   determining a second number of the plurality of transition points corresponding to the second portion;
   determining that the second number of transition points exceeds the first number of transition points; and
   sending, to the image capture device, a request to send the second portion prior to sending the first portion.

2. The computer-implemented method of claim 1, further comprising:
   determining a plurality of complexity metrics from the sampled video data, including determining a first complexity metric of the plurality of complexity metrics that corresponds to a measure of interest in the first video frame in the sampled video data;

identifying a second complexity metric having a highest value from among the plurality of complexity metrics;

determining a fourth video frame corresponding to the second complexity metric;

determining a fifth video frame captured before the fourth video frame;

determining a sixth video frame captured after the fourth video frame;

determining a region of interest in the sampled video data associated with the fifth video frame and the sixth video frame, the region of interest corresponding to pixel coordinates associated with an object represented in the sampled video data; and determining a third portion of the first video data from the fifth video frame to the sixth video frame corresponding to the region of interest.

3. The computer-implemented method of claim 1, further comprising:

receiving, from the image capture device, a plurality of sections of the first video data, including receiving a first section of the plurality of sections that corresponds to the first transition point and associated with a first period of time;

selecting a second section of the plurality of sections;

determining a third portion of the first video data including the second section;

sending, to the image capture device, a request to receive the third portion; and receiving, from the image capture device, the third portion.

4. The computer-implemented method of claim 1, further comprising:

receiving the second portion;

generating first annotation data associated with the second portion, the first annotation data indicating objects represented in a fourth video frame in the second portion;

receiving the first portion;

generating second annotation data associated with the first portion;

determining, using the first annotation data, a first selection of the first video data;

determining, using the second annotation data, a second selection of the first video data; and generating a video summarization including the first selection and the second selection.

5. A computer-implemented method, comprising:

receiving preview data associated with first video data, the preview data comprising sampled video data and at least one of: annotation data associated with first video data, audio data corresponding to the first video data or characteristic data indicating characteristics of the audio data, the sampled video data having a first frame rate that is different than a second frame rate of the first video data and comprising a first portion associated with a first time and a second portion associated with a second time captured after the first time;

determining a first similarity score that corresponds to a first similarity between a first video frame and a second video frame in the sampled video data;

determining a second similarity score that corresponds to a second similarity between the first video frame and a third video frame in the sampled video data;

determining, using the first similarity score and the second similarity score, a first series of contiguous video frames;

determining a second series of contiguous video frames;

determining a first transition point that corresponds to a transition between the first series and the second series;

determining a first number of transition points that correspond to the first portion;

determining a second number of transition points that correspond to the second portion;

determining that the second number exceeds the first number;

sending a request to send the second portion; and receiving the second portion prior to receiving the first portion.

6. The computer-implemented method of claim 5, further comprising receiving a plurality of sections of the first video data, including receiving a first section of the plurality of sections that corresponds to the first transition point in the sampled video data and is associated with a first period of time;

selecting a second section of the plurality of sections;

determining a third portion of the first video data that includes at least a portion of the second section;

sending a request to receive the third portion; and receiving the third portion.

7. The computer-implemented method of claim 5, further comprising:

determining a plurality of complexity metrics from the sampled video data, including determining a first complexity metric that corresponds to a measure of interest in the first video frame;

identifying a second complexity metric having a highest value from among the plurality of complexity metrics;

determining a fourth video frame corresponding to the second complexity metric;

determining a fifth video frame captured before the fourth video frame;

determining a sixth video frame captured after the fourth video frame;

determining a third portion of the first video data from the fifth video frame to the sixth video frame;

sending a request to receive the third portion; and receiving the third portion.

8. The computer-implemented method of claim 7, further comprising:

determining a region of interest in the sampled video data associated with the fifth video frame and the sixth video frame, the region of interest corresponding to pixel coordinates associated with an object represented in the sampled video data; and determining the third portion of the first video data from the fifth video frame and the sixth video frame corresponding to the region of interest.

9. The computer-implemented method of claim 5, further comprising:

determining, using a first period of time, that the sampled video data comprises a plurality of video sections;

determining a plurality of complexity metrics from the sampled video data, including determining a first complexity metric of the plurality of complexity metrics that corresponds to a measure of interest in the first video frame in the sampled video data;

identifying a second complexity metric having a highest value from among the plurality of complexity metrics;

determining a fourth video frame corresponding to the second complexity metric;
identifying a second video section of the plurality of video sections that includes the fourth video frame;
sending a request to receive a third portion of the first video data corresponding to the second video section prior to receiving remaining portions of the first video data; and
receiving the third portion.

10. The computer-implemented method of claim 5, further comprising:
determining a first group of similarity scores that are above a threshold;
determining a first series of contiguous video frames corresponding to the first group of similarity scores;
selecting the first series as the first portion;
determining that a second group of similarity scores are above the threshold;
determining a second series of contiguous video frames corresponding to the second group of similarity scores, wherein the second series is longer than the first series; and
selecting the second series as the second portion.

11. The computer-implemented method of claim 5, further comprising
determining a complexity metric associated with a second transition point of the transition points;
determining that the complexity metric exceeds a threshold;
sending a request to receive a third portion of the first video data including the second transition point; and
receiving the third portion.

12. The computer-implemented method of claim 5, further comprising:
receiving the second portion;
generating first annotation data associated with the second portion, the first annotation data indicating characteristics associated with a fourth video frame in the second portion;
receiving the first portion;
generating second annotation data associated with the first portion;
determining, using the first annotation data, a first selection of the first video data;
determining, using the first annotation data, a second selection of the first video data; and
generating a video summarization including the first selection and the second selection.

13. A device, comprising:
at least one processor;
a memory device including instructions operable to be executed by the at least one processor to configure the device to:
receive preview data associated with first video data, the preview data comprising sampled video data and at least one of: annotation data associated with first video data, audio data corresponding to the first video data or characteristic data indicating characteristics of the audio data, the sampled video data having a first frame rate that is different than a second frame rate of the first video data and comprising a first portion associated with a first time and a second portion associated with a second time captured after the first time;
determine a first similarity score that corresponds to a first similarity between a first video frame and a second video frame in the sampled video data;
determine a second similarity score that corresponds to a second similarity between the first video frame and a third video frame in the sampled video data;
determine, using the first similarity score and the second similarity score, a first series of contiguous video frames;
determine a second series of contiguous video frames;
determine a first transition point that corresponds to a transition between the first series and the second series;
determine a first number of transition points that correspond to the first portion;
determine a second number of transition points that correspond to the second portion;
determine that the second number exceeds the first number;
send a request to send the second portion; and
receive the second portion prior to receiving the first portion.

14. The system of claim 13, wherein the instructions further configure the system to:
receive a plurality of sections of the first video data, including receiving a first section of the plurality of sections that corresponds to the first transition point in the sampled video data and is associated with a first period of time;
select a second section of the plurality of sections;
determine a third portion of the first video data that includes at least a portion of the second section;
send a request to receive the third portion; and
receive the third portion.

15. The system of claim 13, wherein the instructions further configure the system to:
determine a plurality of complexity metrics from the sampled video data, including determining a first complexity metric that corresponds to a measure of interest in the first video frame;
identify a second complexity metric having a highest value from among the plurality of complexity metrics;
determine a fourth video frame corresponding to the second complexity metric;
determine a fifth video frame captured before the fourth video frame;
determine a sixth video frame captured after the fourth video frame;
determine a third portion of the first video data from the fifth video frame to the sixth video frame;
send a request to receive the third portion; and
receive the third portion.

16. The system of claim 15, wherein the instructions further configure the system to:
determine a region of interest in the sampled video data associated with the fifth video frame and the sixth video frame, the region of interest corresponding to pixel coordinates associated with an object represented in the sampled video data; and
determine the third portion of the first video data from the fifth video frame and the sixth video frame corresponding to the region of interest.

17. The system of claim 13, wherein the instructions further configure the system to:
determine, using a first period of time, that the sampled video data comprises a plurality of video sections;
determine a plurality of complexity metrics from the sampled video data, including determining a first complexity metric that corresponds to a measure of interest in the first video frame in the sampled video data;

identify a second complexity metric having a highest value from among the plurality of complexity metrics;
determine a fourth video frame corresponding to the second complexity metric;
identify a second video section of the plurality of video sections that includes the fourth video frame;
send a request to receive a third portion of the first video data corresponding to the second video section prior to receiving remaining portions of the first video data; and
receive the third portion.

18. The system of claim 13, wherein the instructions further configure the system to:
determine a first group of similarity scores that are above a threshold;
determine a first series of contiguous video frames corresponding to the first group of similarity scores;
select the first series as the first portion;
determine a second group of similarity scores that are above the threshold;
determine a second series of contiguous video frames corresponding to the second group of similarity scores, wherein the second series is longer than the first series; and
select the second series as the second portion.

19. The system of claim 13, wherein the instructions further configure the system to:
determine a complexity metric associated with a second transition point of the transition points;
determine that the complexity metric exceeds a threshold;
send a request to receive a third portion of the first video data including the second transition point; and
receive the third portion.

20. The system of claim 13, wherein the instructions further configure the system to:
receive the second portion;
generate first annotation data associated with the second portion, the first annotation data indicating characteristics associated with a fourth video frame in the second portion;
receive the first portion;
generate second annotation data associated with the first portion;
determine, using the first annotation data, a first selection of the first video data;
determine, using the first annotation data, a second selection of the first video data; and
generate a video summarization including the first selection and the second selection.

* * * * *